US012620700B2

(12) United States Patent
Hollenbeck et al.

(10) Patent No.: US 12,620,700 B2
(45) Date of Patent: May 5, 2026

(54) DYNAMICALLY SHAPABLE ANTENNA

(71) Applicant: The Johns Hopkins University, Baltimore, MD (US)

(72) Inventors: Jennifer S. Hollenbeck, Fork, MD (US); Steven M. Storck, Catonsville, MD (US)

(73) Assignee: The Johns Hopkins University, Baltimore, MD (US)

(*) Notice: Subject to any disclaimer, the term of this patent is extended or adjusted under 35 U.S.C. 154(b) by 17 days.

(21) Appl. No.: 18/921,202

(22) Filed: Oct. 21, 2024

(65) Prior Publication Data

US 2025/0132493 A1 Apr. 24, 2025

Related U.S. Application Data

(60) Provisional application No. 63/591,867, filed on Oct. 20, 2023.

(51) Int. Cl.
*H01Q 3/01* (2006.01)

(52) U.S. Cl.
CPC .................................... *H01Q 3/01* (2013.01)

(58) Field of Classification Search
CPC ........................................................ H01Q 3/01
See application file for complete search history.

(56) References Cited

U.S. PATENT DOCUMENTS

| | | | | |
|---|---|---|---|---|
| 7,886,535 | B2 | 2/2011 | Matsuki | |
| 10,056,934 | B2 * | 8/2018 | Iorio | H01Q 9/14 |
| 10,518,908 | B2 | 12/2019 | Koehler et al. | |
| 11,047,370 | B1 | 6/2021 | Koehler et al. | |
| 2002/0014992 | A1 * | 2/2002 | Sun | H01Q 3/01 343/846 |

OTHER PUBLICATIONS

Stephen J. Furst et al., "Stress, strain, and resistance behavior of two opposing shape memory alloy actuator wires for resistance-based self-sensing applications," Journal of Intelligent Material Systems and Structures, 24(16), Nov. 2013, pp. 1951-1968.

* cited by examiner

*Primary Examiner* — Seung H Lee
(74) *Attorney, Agent, or Firm* — Noah J. Hayward

(57) ABSTRACT

An antenna assembly may include a shape change antenna configured to transmit an electromagnetic wave or receive an electromagnetic wave. The shape change antenna may have an antenna shape and may be formed of a conductive shape memory material that physically moves in response to changes in a non-geometric characteristic. The antenna assembly may also include a shape change stimulator configured to change the non-geometric characteristic of the shape change antenna to cause the antenna shape to physically change between a first geometry and a second geometry.

19 Claims, 21 Drawing Sheets

DYNAMICALLY SHAPABLE ANTENNA

CROSS-REFERENCE TO RELATED APPLICATIONS

This application claims priority to and the benefit of prior-filed, U.S. Provisional Application No. 63/591,867 filed on Oct. 20, 2023, the entire contents of which are hereby incorporated herein by reference.

TECHNICAL FIELD

Example embodiments generally relate to electromagnetic field and wave technology and, in particular, relate to antenna technologies.

BACKGROUND

The wireless revolution has led to an increasing demand for wireless communications and wireless signal detection technologies. However, operation as a single application device has proven to be limiting. There is an increasing demand for multi-application devices that have broad capabilities requiring an electromagnetic (EM) wave interface that supports a number of different applications. If size and weight were not common constraints, such multi-application devices could be constructed with dedicated components (i.e., separate, dedicated antennas) for each application. However, the demands continue to increase for miniaturized and mobile technologies. Such requirements can exist in spacecraft implementations that may have requirements for detecting EM waves within a broad frequency band for a first science-based application, and also requirements for communications at a specific frequency via a directional beam, where the specific frequency is out of band from the broad frequency band for the science-based application. Similar requirements have arisen for drones in aerial and underwater contexts. These are but a few examples of such requirements. While technologies such as phased arrays and software defined radios have attempted to provide configurable solutions in these and similar contexts, such technologies still have limitations that require further fundamental advances to overcome.

BRIEF SUMMARY

According to some non-limiting, example embodiments, an apparatus for transmitting or receiving electromagnetic waves is described. The apparatus may include a base structure, a front end configured to condition a signal for transmission as a transmitted electromagnetic wave via a transmitter of the front end or condition a received electromagnetic wave received via a receiver of the front end, and a shape change antenna operably coupled to the front end and configured to transmit the transmitted electromagnetic wave or receive the received electromagnetic wave. The shape change antenna may have an antenna shape and may be formed of a material including a conductive shape memory material that physically moves in response to changes in a non-geometric characteristic. The shape change antenna may be physically coupled to the base structure. The apparatus may further include a shape change stimulator configured to change the non-geometric characteristic to cause the antenna shape of the shape change antenna to physically change and shape control circuity configured to control the shape change stimulator to change the non-geometric characteristic to cause the antenna shape to change between a first geometry and a second geometry. At least a portion of the shape change antenna may physically move relative to the base structure as the shape change antenna transitions between the first geometry and the second geometry.

According to some example embodiments, an antenna assembly is described. The antenna assembly may include a shape change antenna configured to transmit an electromagnetic wave or receive an electromagnetic wave. The shape change antenna may have an antenna shape and may be formed of a material including a conductive shape memory material that physically moves in response to changes in a non-geometric characteristic. The antenna assembly may also include a shape change stimulator configured to change the non-geometric characteristic of the shape change antenna to cause the antenna shape to physically change between a first geometry and a second geometry.

According to other non-limiting, example embodiments, a method for modifying electromagnetic characteristics by changing an antenna shape of a shape change antenna is described. The method may include controlling, by circuitry, a shape change stimulator to change a non-geometric characteristic of the shape change antenna to a first value to cause the antenna shape to physically change into a first geometry. The shape change antenna may be formed of a material including a conductive shape memory material that responds to changes in the non-geometric characteristic. The method may also include transmitting or receiving an electromagnetic wave via the shape change antenna in the first geometry and controlling, by the circuitry, the shape change stimulator to change the non-geometric characteristic of the shape change antenna to a second value, different from the first value, to cause the antenna shape to physically change from the first geometry to a second geometry. The method may also include transmitting or receiving a second electromagnetic wave via the shape change antenna in the second geometry.

BRIEF DESCRIPTION OF THE DRAWINGS

Figure 1A:
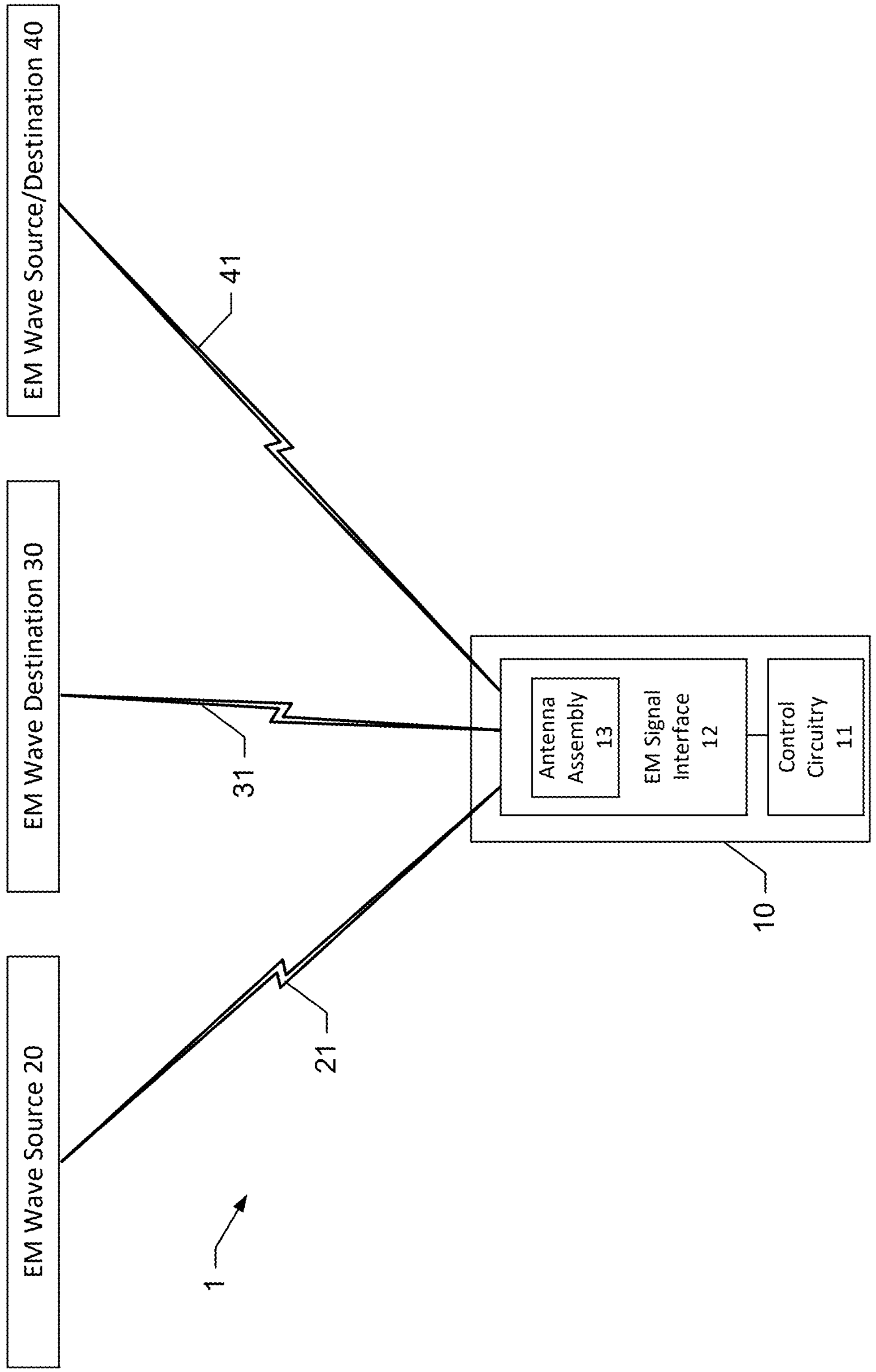
Figure 1B:
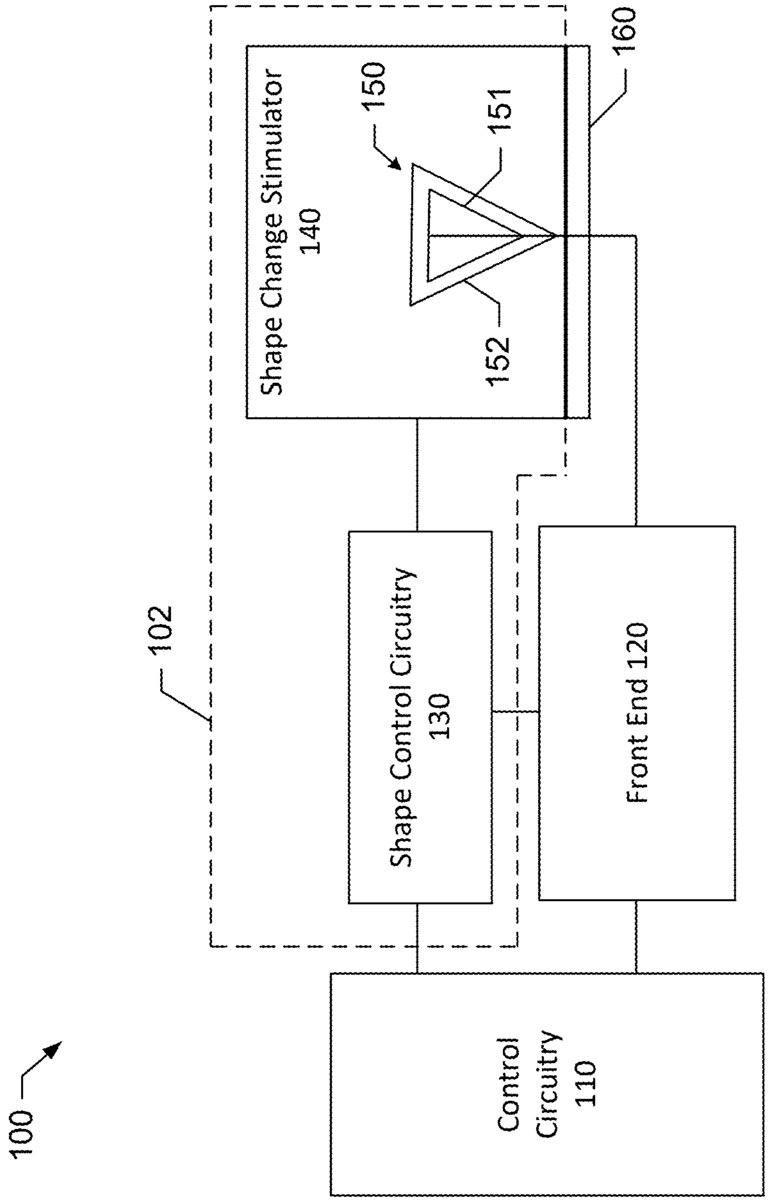
Figure 2A:
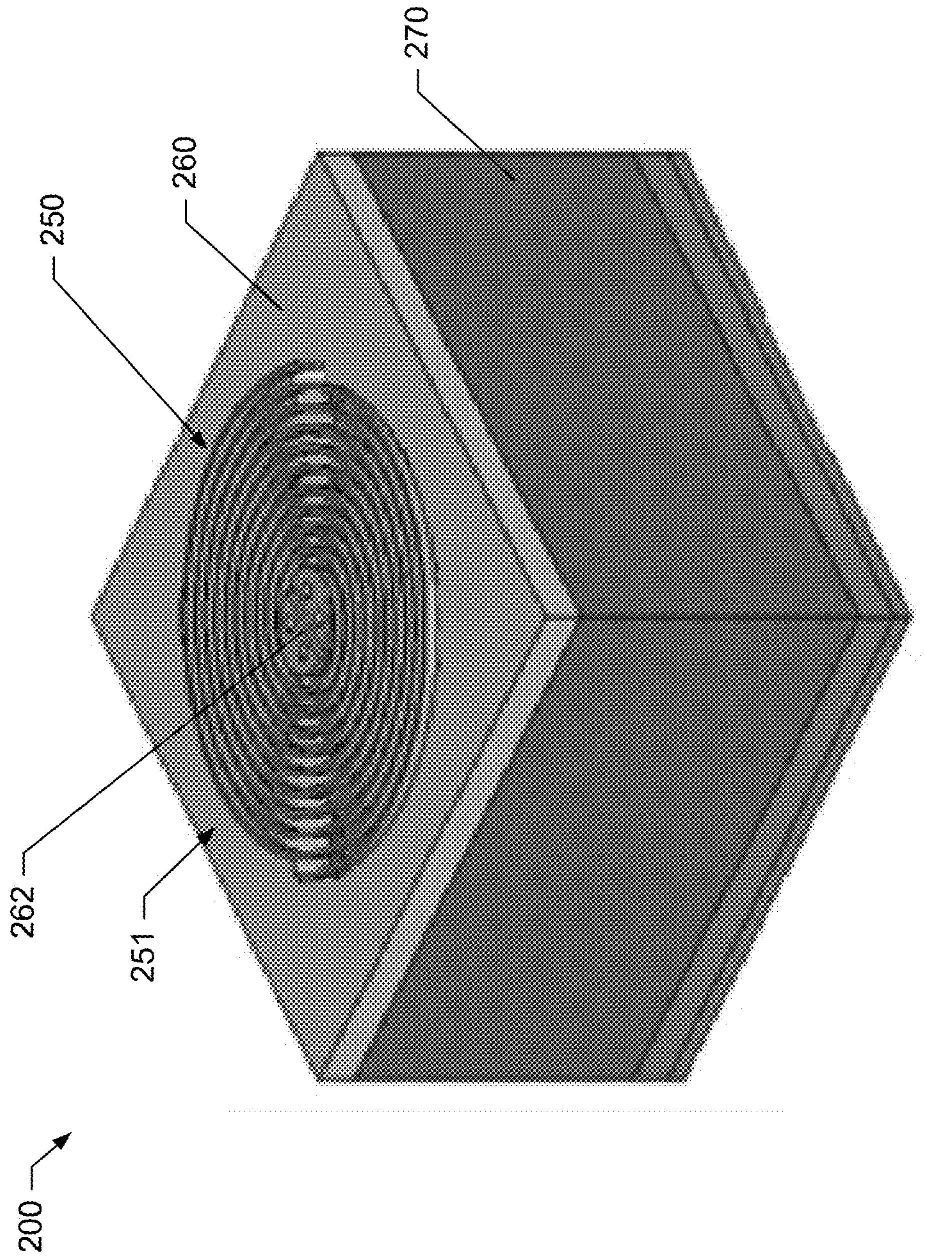
Figure 2B:
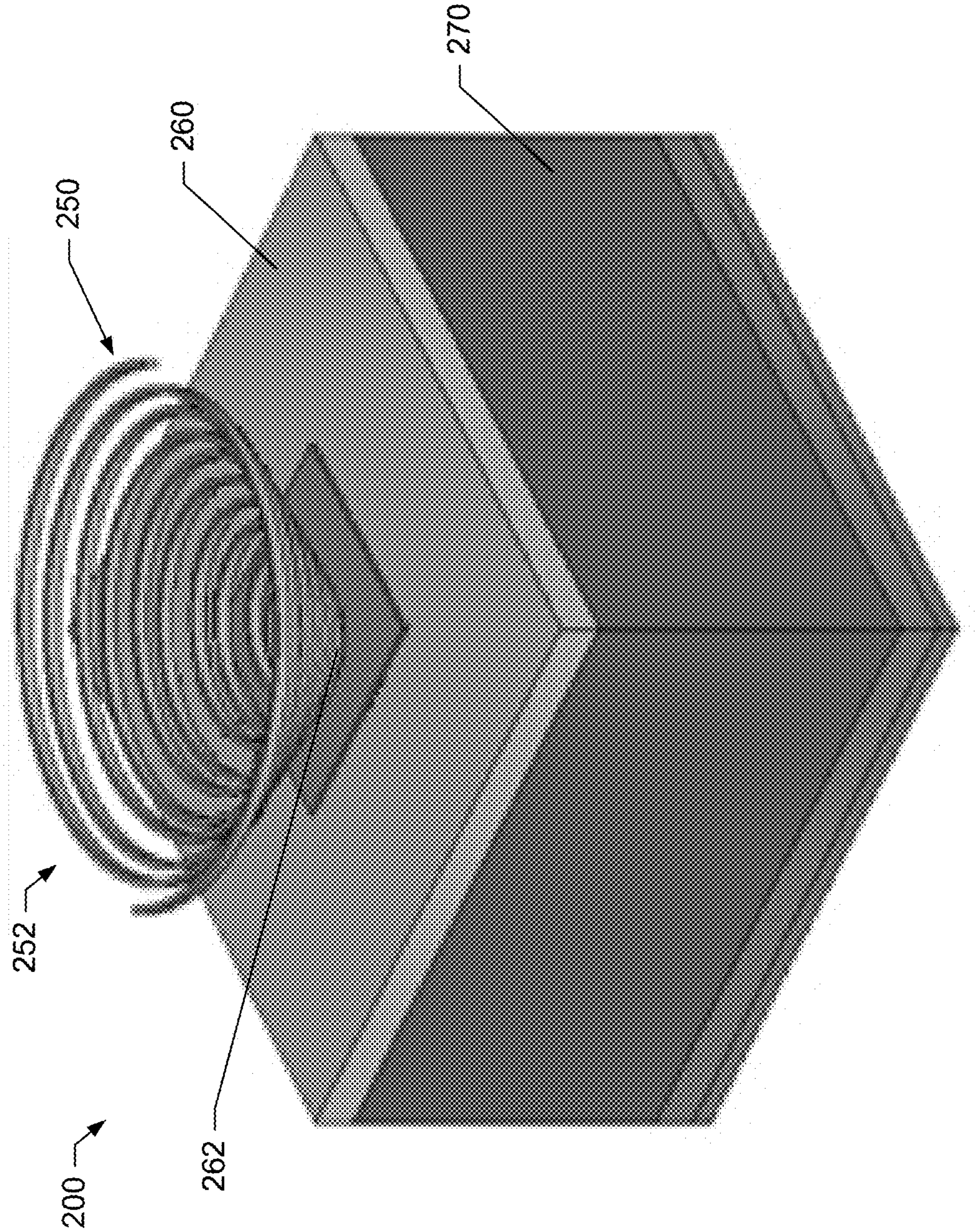
Figure 3B:
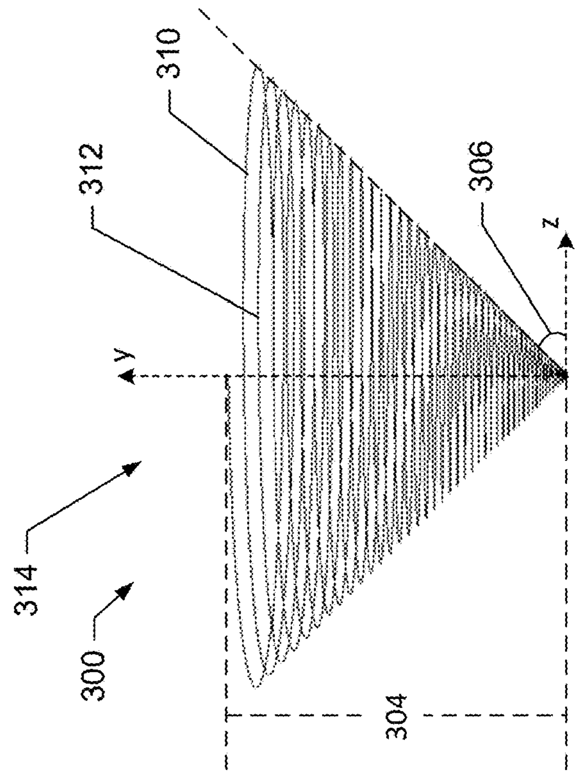
Figure 3A:
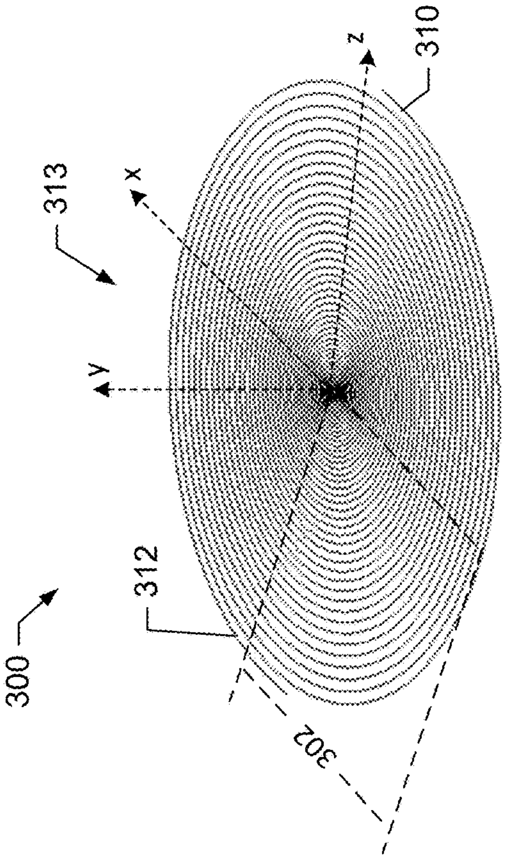
Figure 3D:
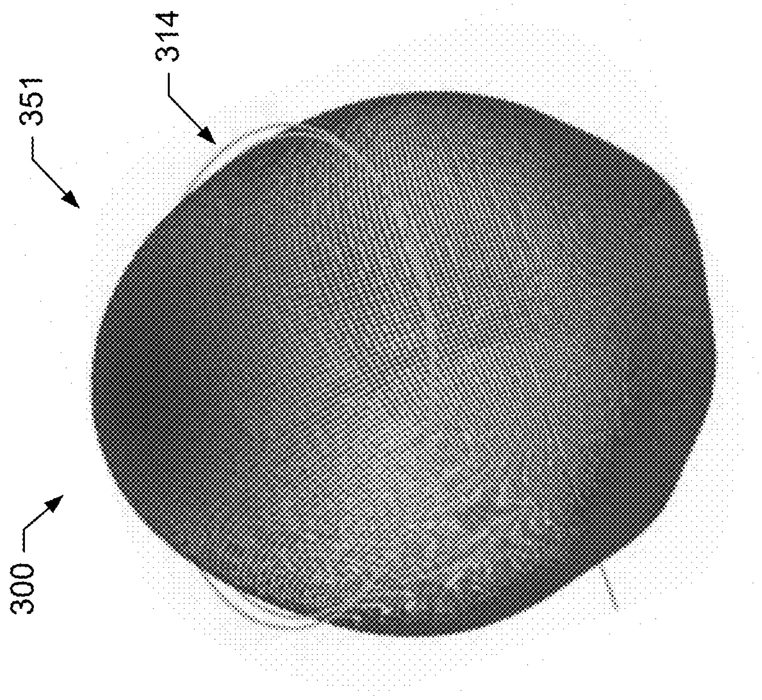
Figure 3C:
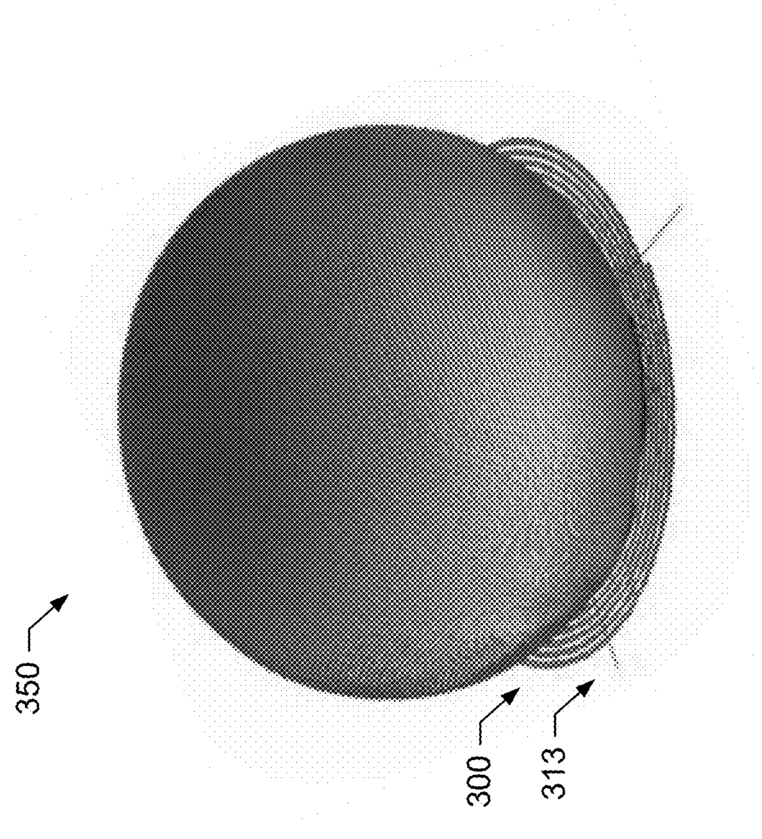
Figure 4A:
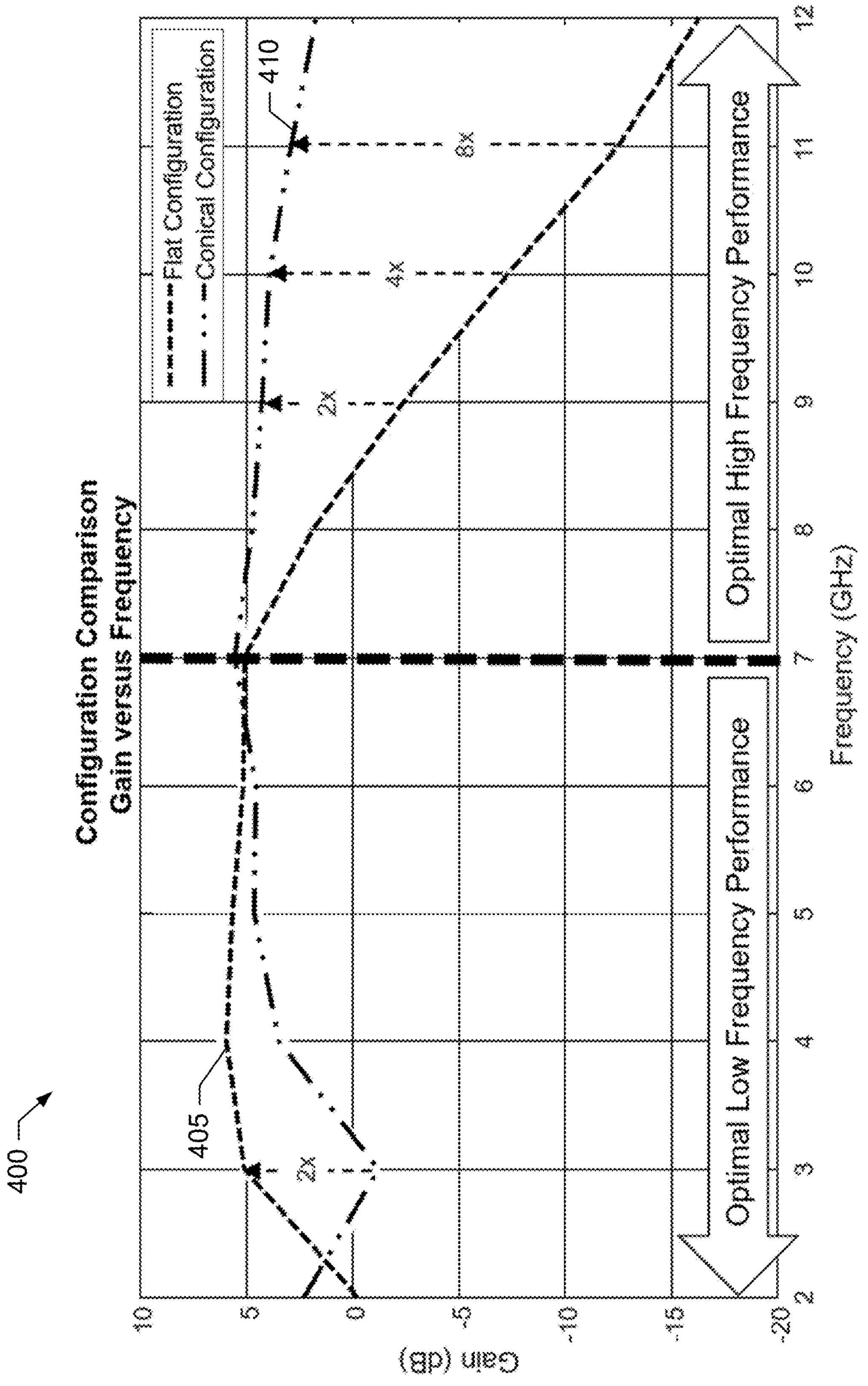
Figure 4B:
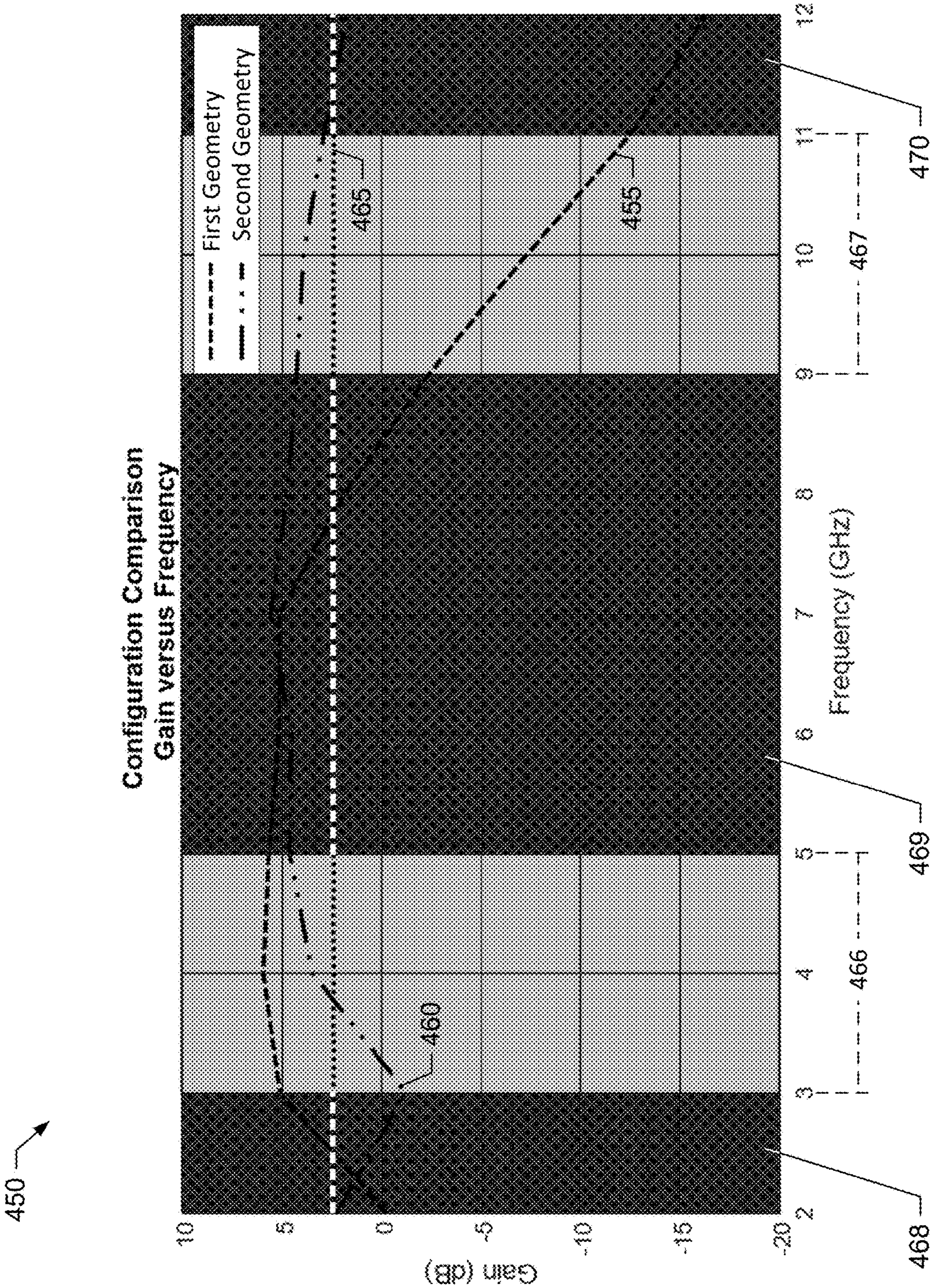
Figure 4C:
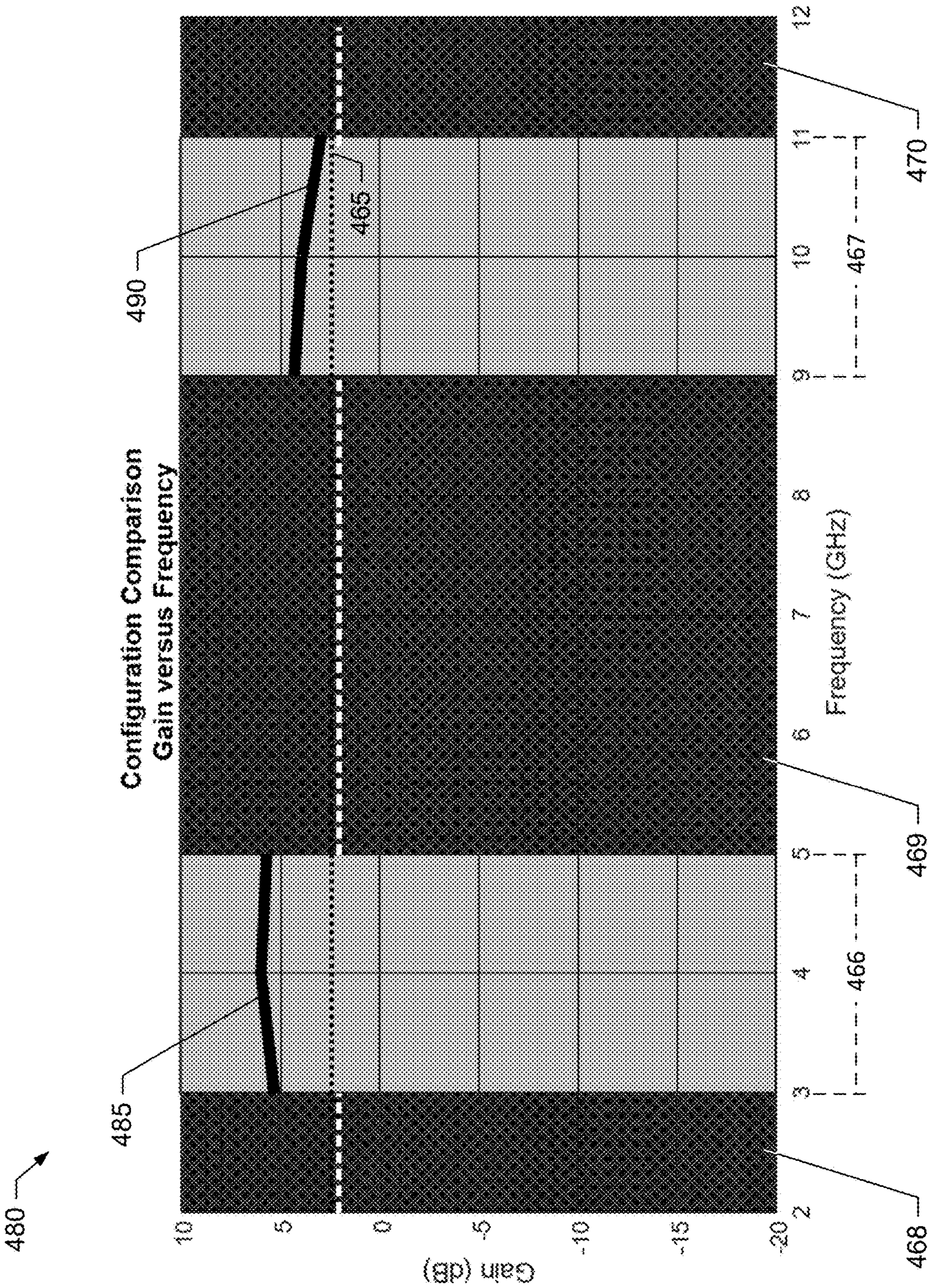
Figure 5B:
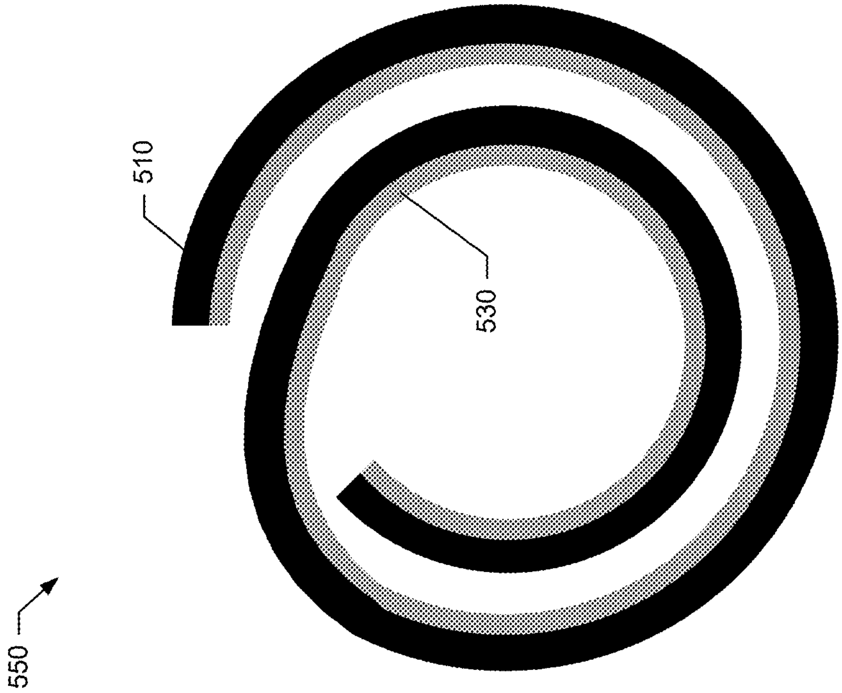
Figure 5A:
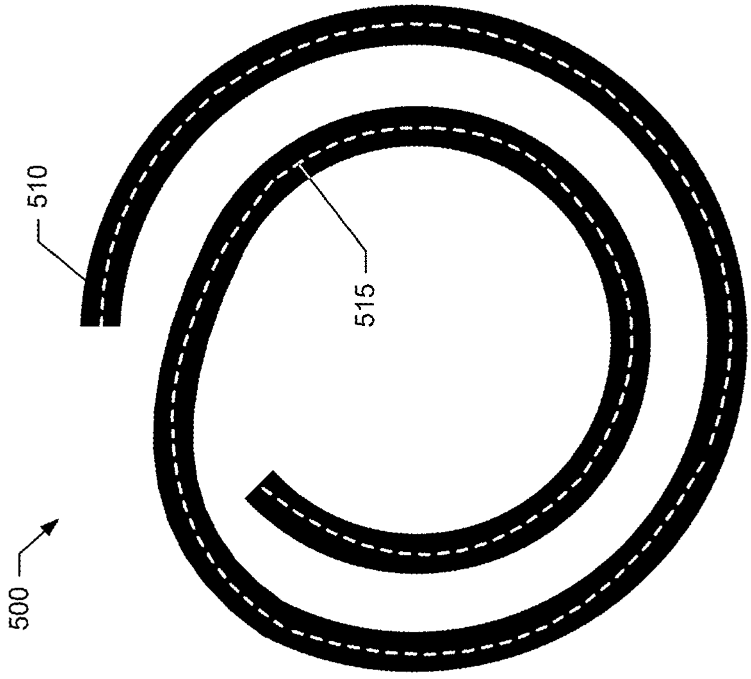
Figure 6:
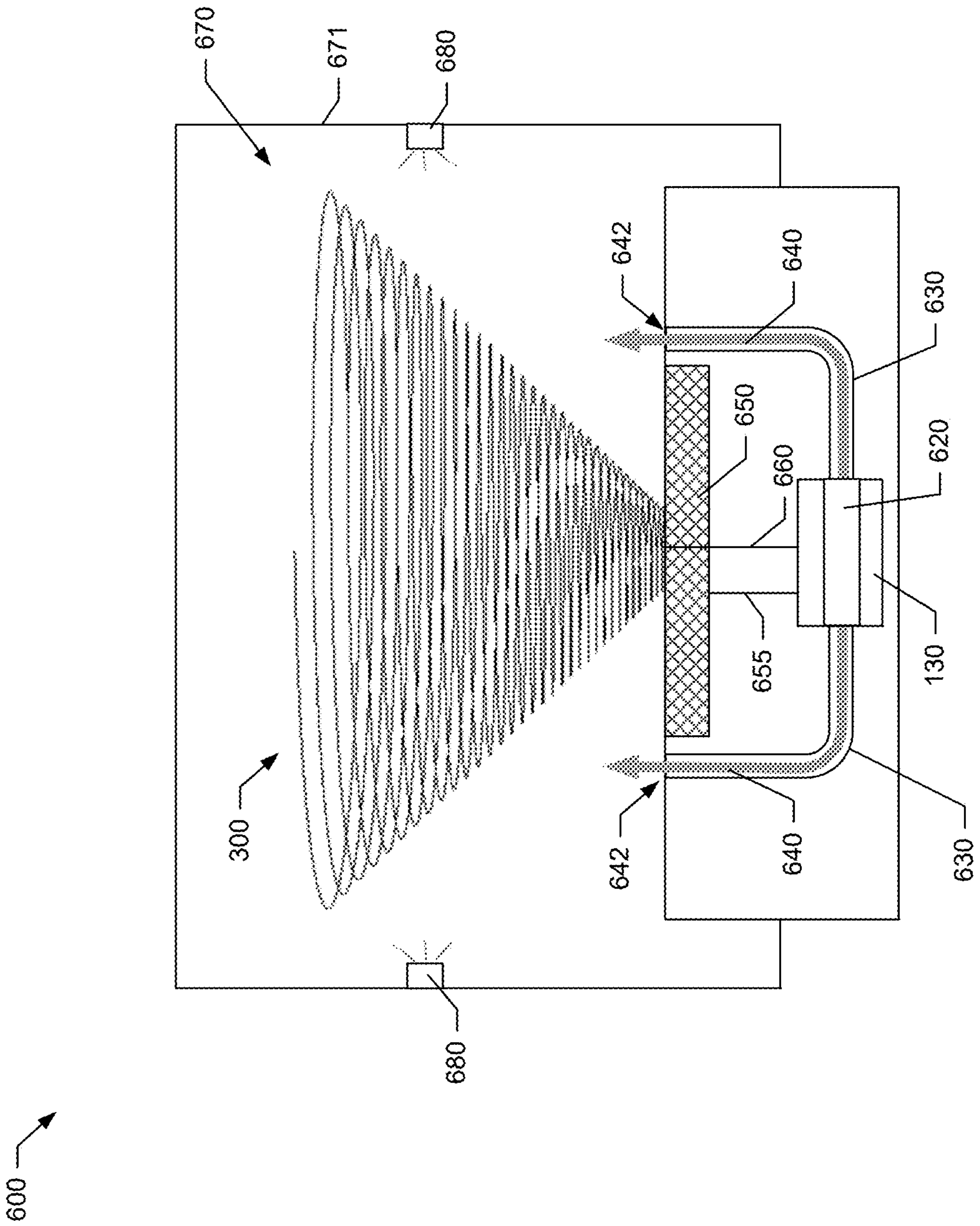
Figure 7B:
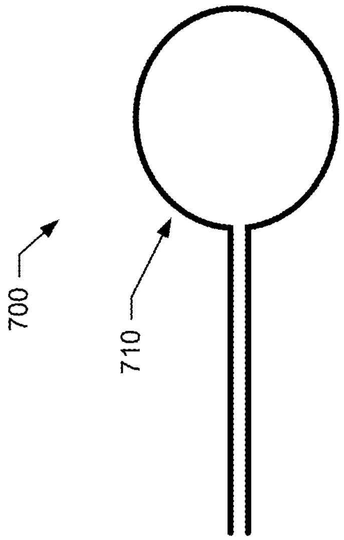
Figure 7A:
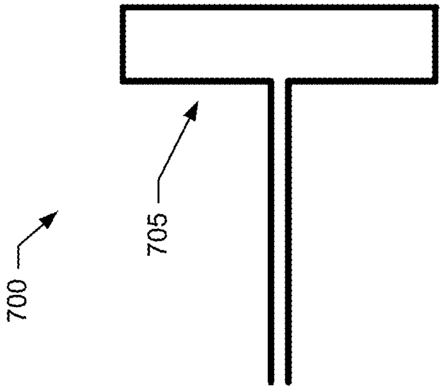
Figure 8B:
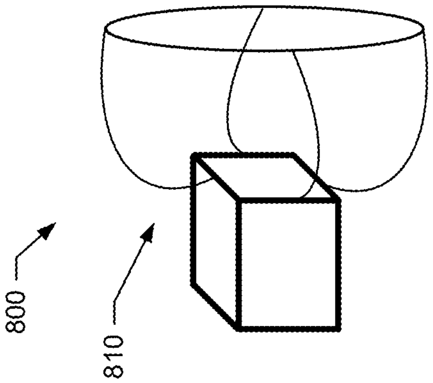
Figure 8A:
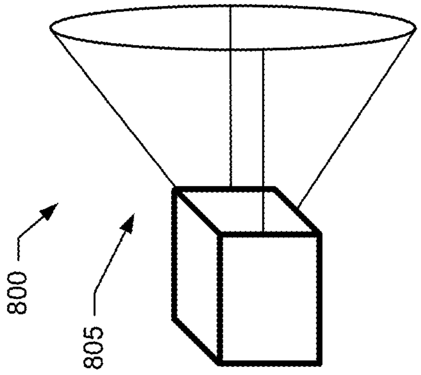
Figure 9A:
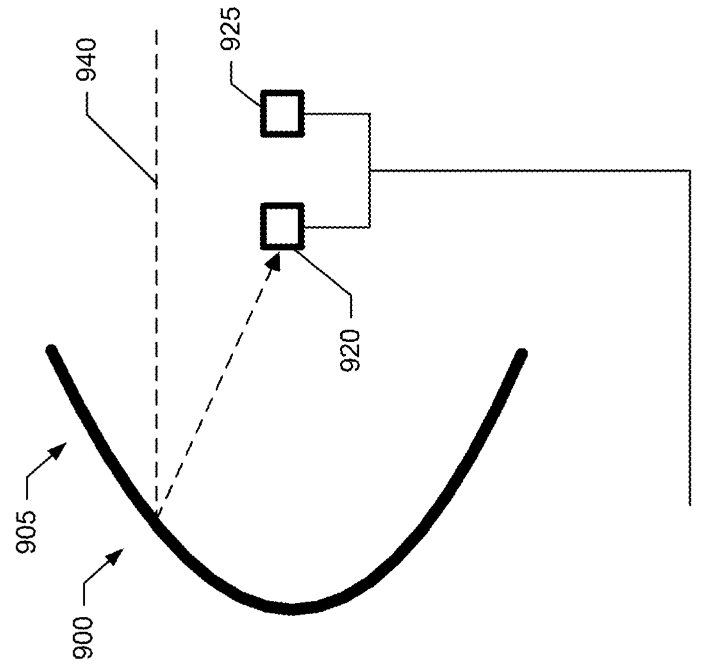
Figure 9B:
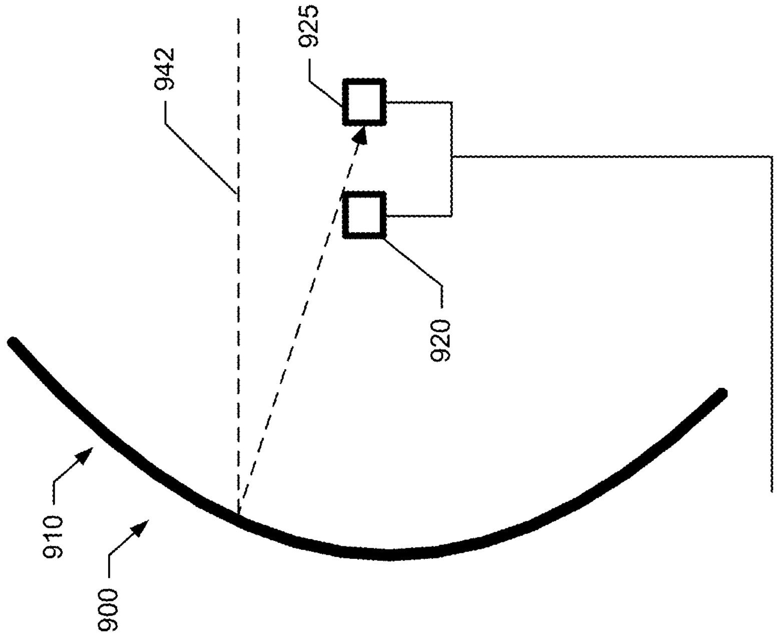
Figure 10:
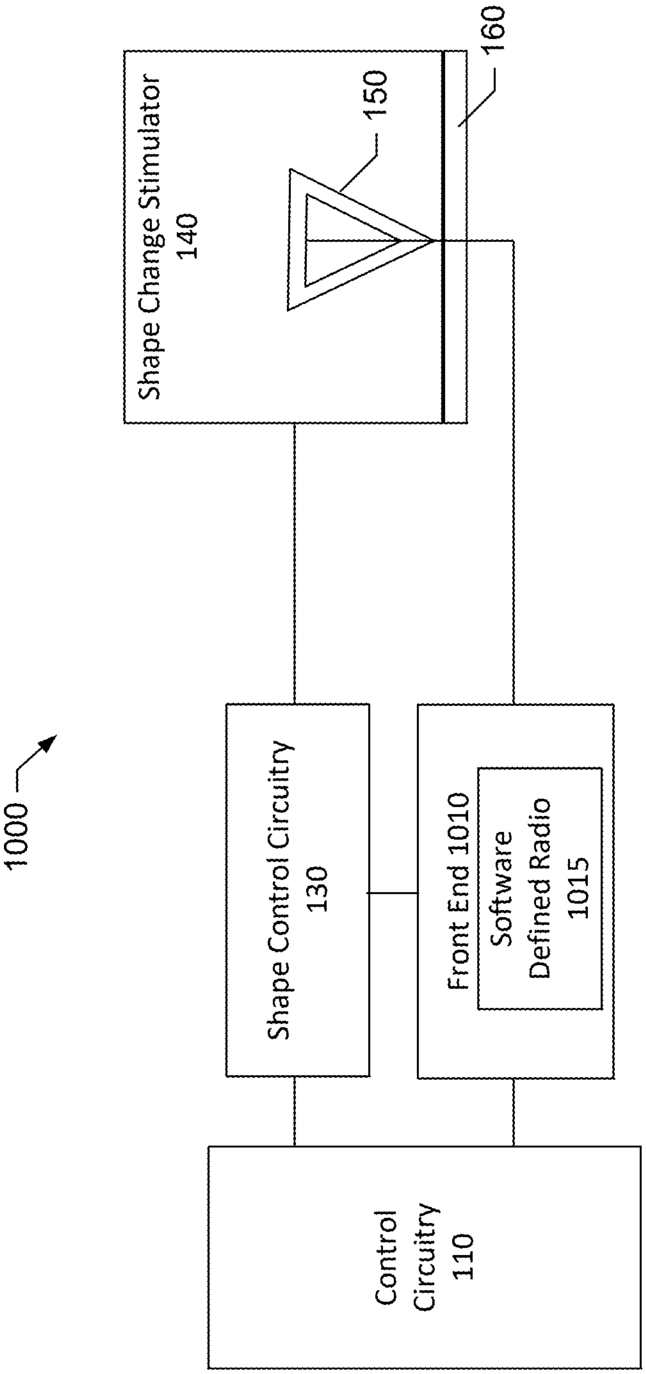
Figure 11:
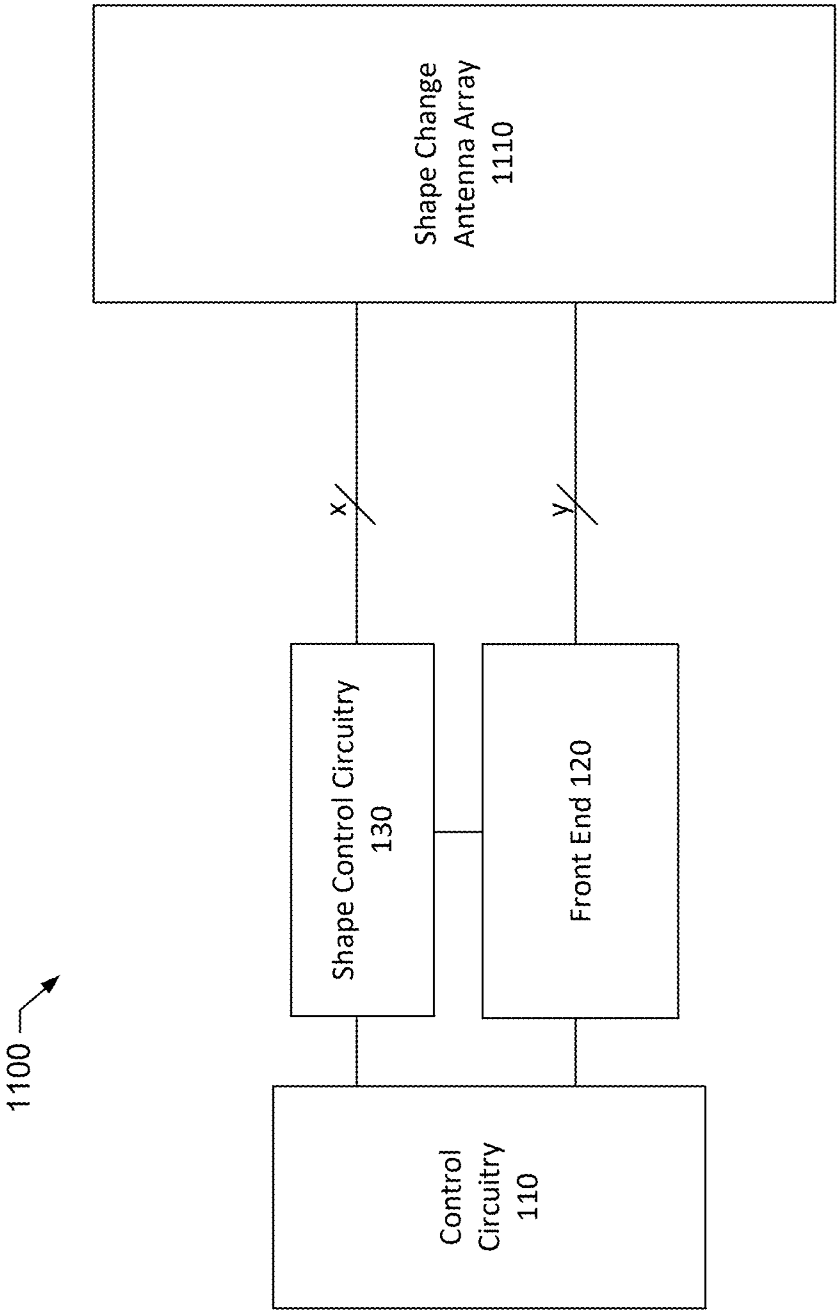
Figure 12A:
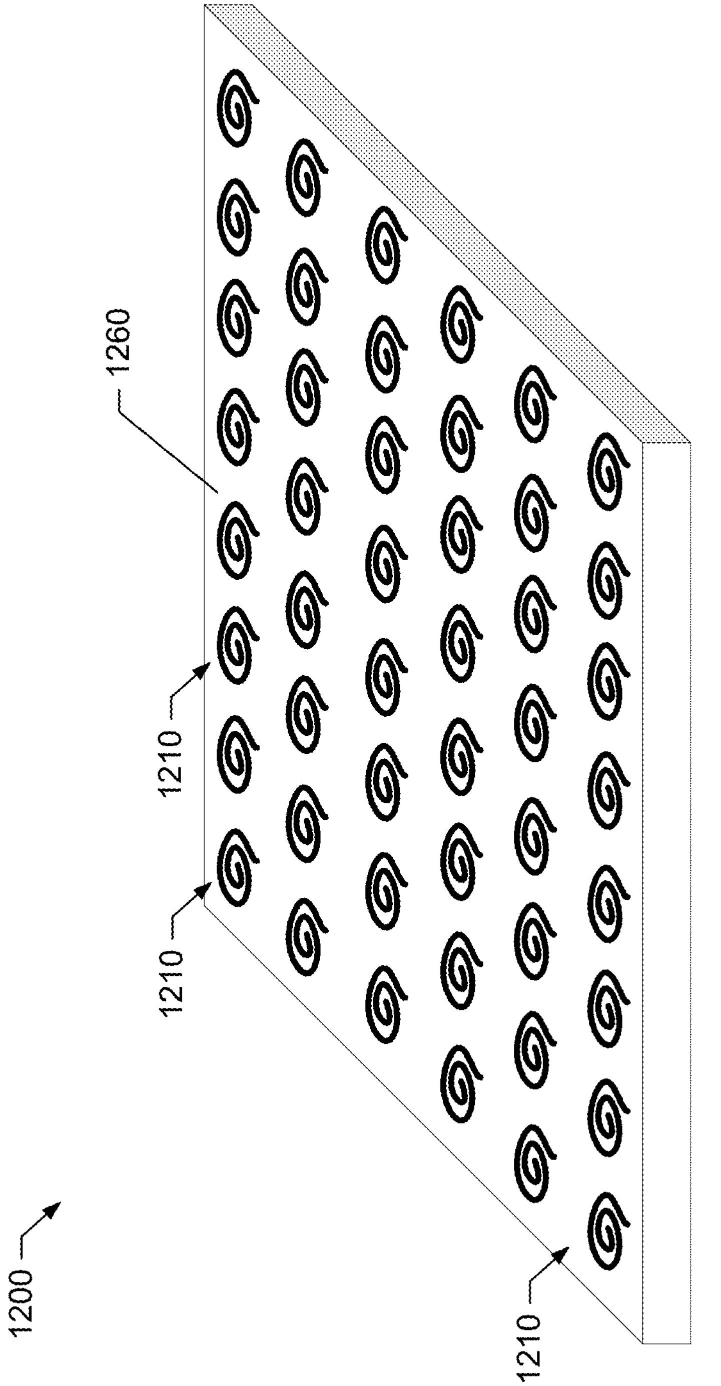
Figure 12B:
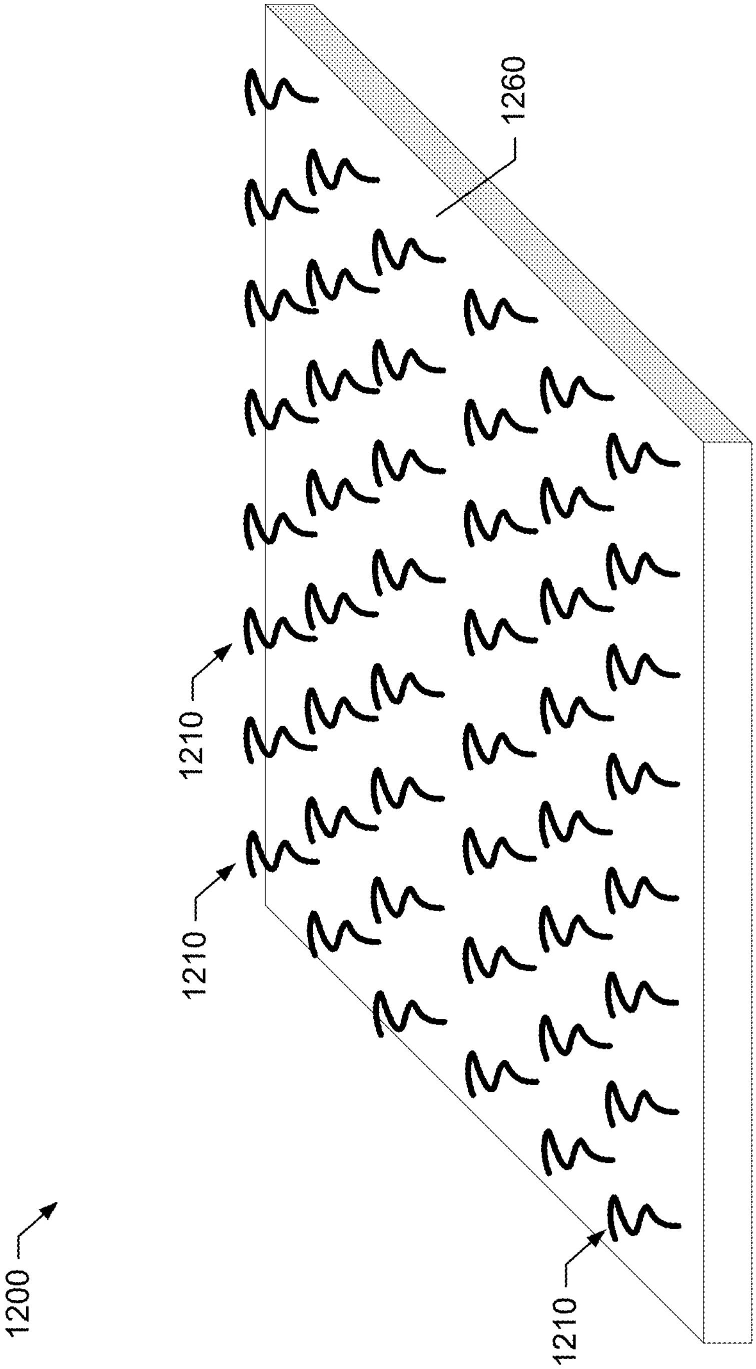
Figure 12C:
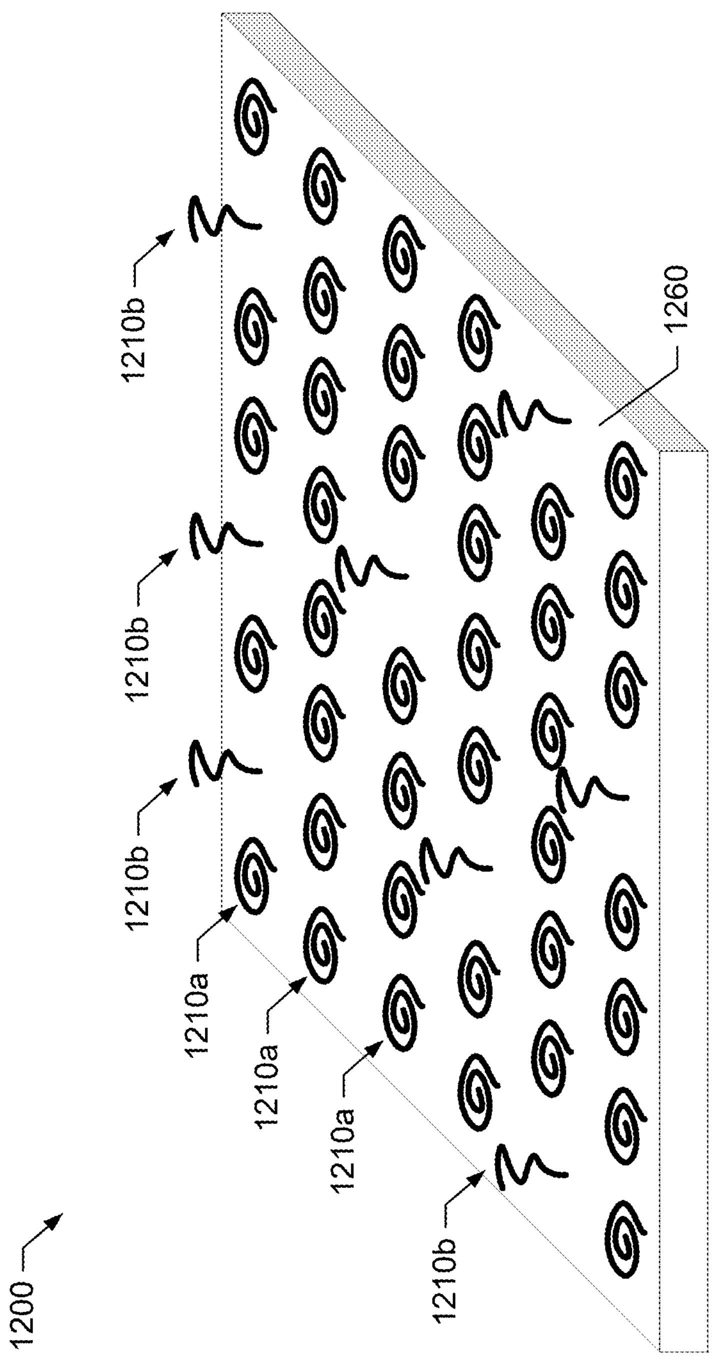
Figure 13A:
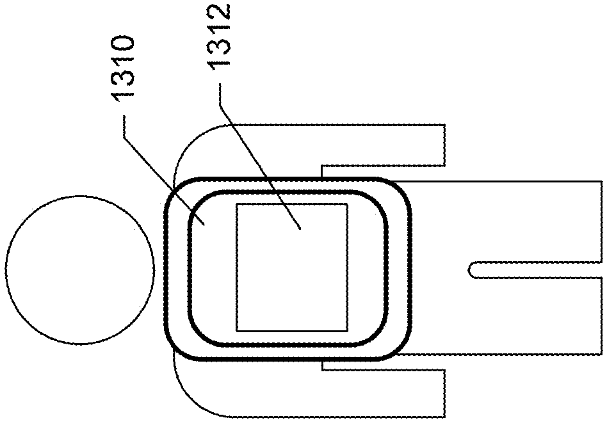
Figure 13B:
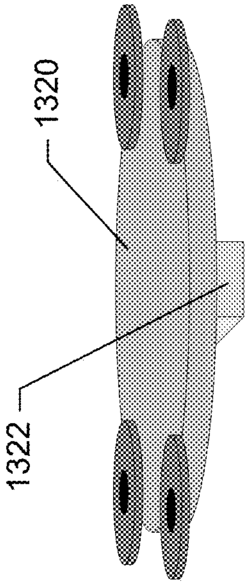
Figure 13C:
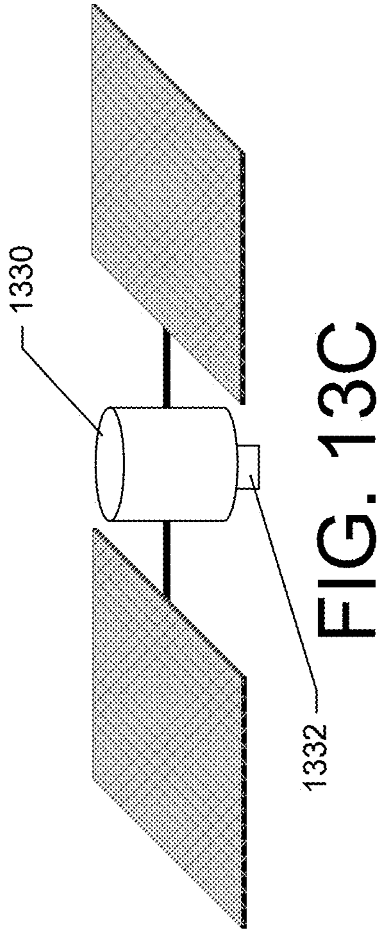
Figure 14:
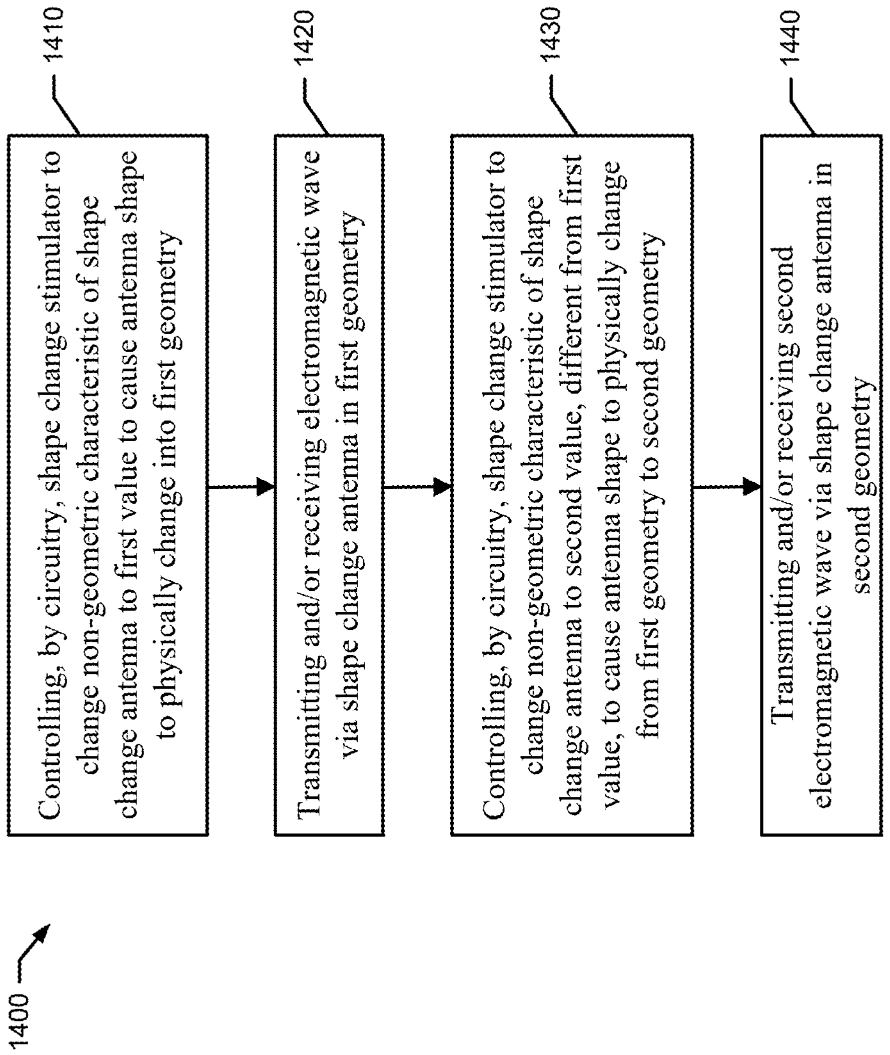

Having thus described some non-limiting, example embodiments in general terms, reference will now be made to the accompanying drawings, which are not necessarily drawn to scale, and wherein:

FIG. 1A illustrates an example system-level implementation according to some example embodiments;

FIG. 1B illustrates a block diagram of a signaling device according to some example embodiments;

FIG. 2A illustrates a shape change antenna with an antenna shape having a first geometry according to some example embodiments;

FIG. 2B illustrates the shape change antenna of FIG. 2A with an antenna shape having a second geometry according to some example embodiments;

FIG. 3A illustrates an isolated view of a shape change antenna with an antenna shape having a first geometry according to some example embodiments;

FIG. 3B illustrates an isolated view of the shape change antenna of FIG. 3A with an antenna shape having a second geometry according to some example embodiments;

FIG. 3C illustrates a radiation pattern of a shape change antenna with an antenna shape having a first geometry according to some example embodiments;

FIG. 3D illustrates a radiation pattern of a shape change antenna with an antenna shape having a second geometry according to some example embodiments;

FIG. 4A illustrates a graph of gain versus frequency for an antenna having a first geometry and an antenna having a second geometry according to some example embodiments;

FIG. 4B illustrates a graph of gain versus frequency for an antenna having a first geometry and an antenna having a second geometry and defining operating frequency bands and a gain threshold according to some example embodiments;

FIG. 4C illustrates a graph of gain versus frequency for a shape change antenna and defining operating frequency bands and a gain threshold according to some example embodiments;

FIG. 5A illustrates a shape change antenna with a shape change stimulator component according to some example embodiments;

FIG. 5B illustrates a shape change antenna with another shape change stimulator component according to some example embodiments;

FIG. 6 illustrates a shape change stimulator having a plurality of operational modes according to some example embodiments;

FIG. 7A illustrates a shape change antenna with an antenna shape that is a first geometry according to some example embodiments;

FIG. 7B illustrates a shape change antenna with an antenna shape that is a second geometry according to some example embodiments;

FIG. 8A illustrates a shape change antenna with an antenna shape that is a first geometry according to some example embodiments;

FIG. 8B illustrates a shape change antenna with an antenna shape that is a second geometry according to some example embodiments;

FIG. 9A illustrates a shape change antenna with an antenna shape that is a first geometry according to some example embodiments;

FIG. 9B illustrates a shape change antenna with an antenna shape that is a second geometry according to some example embodiments;

FIG. 10 illustrates a block diagram of a signaling device having a front end including a software defined radio according to some example embodiments;

FIG. 11 illustrates a block diagram of a signaling device including a shape change antenna array according to some example embodiments;

FIG. 12A illustrates a shape change antenna array with shape change antennas having a first geometry according to some example embodiments;

FIG. 12B illustrates a shape change antenna array with shape change antennas having a second geometry according to some example embodiments;

FIG. 12C illustrates a shape change antenna array with shape change antennas having some with a first geometry and some with a second geometry according to some example embodiments;

FIG. 13A illustrates a dynamically shapable antenna in a backpack implementation according to some example embodiments;

FIG. 13B illustrates a dynamically shapable antenna in a drone implementation according to some example embodiments;

FIG. 13C illustrates a dynamically shapable antenna in a spacecraft implementation according to some example embodiments; and FIG. 14 illustrates a flowchart of a method for modifying electromagnetic characteristics by changing an antenna shape of a shape change antenna according to some example embodiments.

DETAILED DESCRIPTION

Some non-limiting, example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In light of the technical limitations of conventional electromagnetic field and wave technologies described above, according to some example embodiments, an advance in electromagnetic wave interface technology, as described herein, has been realized that involves the implementation of antennas that are capable of changing physical shape into different geometries that are specifically tailored for different applications. As described herein, according to some example embodiments, such a shape change antenna, which may be a component of a dynamically shapable antenna, may be a component of an electromagnetic wave interface that exhibits the electromagnetic characteristics (e.g., radiation pattern) involved in the receipt or transmission of electromagnetic waves. In this regard, the shape change antenna may change shape to tailor the antenna's electromagnetic characteristics for provision of a received electromagnetic wave to a receiver of a front end of a signaling device or for transmission of an electromagnetic wave from a transmitter of a front end of a signaling device. According to some example embodiments, to change shape, such shape change antennas may be formed of materials including a conductive shape memory material that can be stimulated to move into different physical configurations to thereby change its electromagnetic characteristics to replicate the functionality of more than one antenna despite being a singular antenna component. In other words, rather than requiring a dedicated antenna for each application (e.g., with specific operating frequency requirements), according to some example embodiments, a single shape change antenna can operate in accordance with a first application (e.g., broadband sensing or detection) while in a first geometry, and then the same shape change antenna can be stimulated to change its physical shape to a second geometry to satisfy the requirements of a second application (e.g., narrow-band communications). Accordingly, the antenna shape can be reconfigured, after deployment, to transition between geometries, to satisfy different application requirements, repeatedly over the antenna's deployed lifetime. Such a single, multi-application antenna has obvious advantages with respect to size and weight, and is therefore ideal for implementations that require a small form factors and lightweight solutions, such as, for example, portable backpack, drone, or spacecraft applications.

According to some example embodiments, implementation of a shape change antenna may have a substantial impact on a wide variety of devices that implement many different applications that perform wireless sensing or communications. Currently, antennas permeate modern day life. From cell phones, airplane communications, satellite internet, radio detection and ranging (RADAR), and any other application that requires wireless connection, antennas are essential for operation to support such applications. In addition, 6G communication standards are headed towards frequency band sharing which may involve operation across multiple frequency bands. With frequency bands extending from high frequency (HF) or lower to greater than 12 GHZ (K-bands) for various types of communication protocols, applications may require functionalities that involve communications technologies that can support such operation across many bands. Such applications not only require a certain frequency response, but may also have gain requirements at certain frequencies that a single, conventional, wideband antenna cannot support.

According to some example embodiments, an ultra-wideband antenna can be realized through the implementation of a shape change antenna that is configured to operate across multiple frequency bands, antenna directional patterns, and gains due to its ability to change physical geometries. To do so, a shape change antenna, as a singular component, may, according to some example embodiments, morph into different shapes without reliance upon external force producing actuators, e.g., motors. Rather, according to some example embodiments, the material used to form the shape change antennas may be a conductive shape memory material that may be stimulated to change shape, thereby changing the electromagnetic characteristic of the shape change antenna. Accordingly, as a singular component, such shape change antennas can reduce the size and weight of wireless signaling sub-systems.

According to some example embodiments, an ability to change physical shape into different antenna geometries can have a variety of effects on the electromagnetic characteristics of the antenna. In this regard, by changing the antenna's geometry, the gain of the antenna at different frequencies can be changed. Moreover, desired beam widths and directionality (i.e., radiation patterns) may be implemented via such changes in geometry. Additionally, according to some example embodiments, other characteristics such as phase, polarization, and ellipticity may be controlled via changes to the geometry.

In this regard, when the antenna shape is in a first geometry, the antenna may be well-suited for operation in a first frequency band (e.g., a lower frequency band). However, after the antenna changes shape into a second geometry, the antenna may now be well-suited for operation in a different (in some cases vastly different) frequency band (e.g., a higher frequency band). Additionally or alternatively, the shape changing functionality of the antenna may be implemented to change the radiation pattern of the antenna for tailored beamforming. The structure of the antenna can cause a radiation pattern to transition between, for example, a more spherical radiation pattern in a first geometry to a more directional radiation pattern in a second geometry, for the same input power.

According to some example embodiments, as mentioned above, a shape change antenna may be formed of a material including a conductive shape memory material that physically moves in response to changes in a non-movement or non-geometric or intrinsic characteristic. In other words, according to some example embodiments, the change in the shape of the antenna may be caused by the antenna itself changing shape and not due to, for example, movement of an external mechanical actuator to, for example, extend or reveal the antenna. Rather, the conductive material of the antenna itself is stimulated via a change in response to a non-geometric characteristic of the antenna (e.g., temperature, presence of a changing electric field, presence in a changing magnetic field, application of chemicals, or the like) to cause the antenna to transition between geometries.

The materials used to form a shape change antenna may, according to some example embodiments, be conductive materials that exhibit a structural memory characteristic. In this regard, according to some example embodiments, a conductive shape memory material used to form a shape change antenna may have a "memory" and may return to a "remembered" shape in response to a stimulus due to a change in a non-geometric characteristic to a certain value. Further, according to some example embodiments, a two-way shape memory material may be utilized that is configured to implement a two-way shape memory effect (TWSME). With a two-way shape memory material, the material may "remember" two states or shapes that can be associated with different values for a non-geometric characteristic. For example, the material may assume a first shape (e.g., for a first geometry) in response to a first temperature condition (e.g., a high temperature) and the material may assume a second shape (e.g., for a second geometry) in response to a second temperature condition (e.g., a low temperature). As such, according to some example embodiments, the material may transition between each shape in response to changes in temperature alone, without the need for external devices (e.g., biasing devices such as springs, etc.) that apply forces to return to one of the states or shapes.

According to some example embodiments, a conductive shape memory material may be fabricated (e.g., via additive manufacturing techniques) to have a desired first configuration. Similarly, the conductive shape memory material may be fabricated (e.g., via additive manufacturing techniques) to have a desired second configuration. As such, the conductive shape memory material may be fabricated into antenna geometries that can change from a first configuration to a second configuration due to the change in the non-geometric characteristic that stimulates the change. According to some example embodiments, the conductive shape memory material may be configured to transition from the first configuration to a second configuration due to an increase in the non-geometric characteristic to a first value, and then transition back to the first configuration in response to the non-geometric characteristic changing back to a second value. While such changes between configurations may be correlated to changes in the non-geometric characteristic, the configuration changes may need to be verified and adjusted due to the sensitivity of antenna performance. As such, according to some example embodiments, a feedback parameter may be monitored to determine whether a shape change antenna has transitioned into a desired geometry. In this regard, according to some example embodiments, a resistive measurement of the shape change antenna may be used as a feedback parameter to determine whether the shape change antenna has reached a desired geometry, since a conductive shape memory material may have a resistance to position relationship that can be leveraged for this purpose.

According to some example embodiments, the conductive shape memory material used in the construction of a shape change antenna may be, for example, a shape memory alloy material, a conductive shape memory polymer, or a conductive shape memory carbon-based material, a hybrid combination thereof, or the like. As a shape memory alloy, the conductive shape memory material may be NiTi (nickel-titanium), CuZnAl (copper-zinc-aluminum) or the like, which may be made increasingly conductive with the addition of elements such as copper, silver, or like. In particular, nickel-rich precipitates, such as $Ni_4Ti_3$, may be particularly effective for two-way memory implementations due to an ability to create mechanical biasing internal to the material that can be triggered in response to changes in, for example, temperature. The shape memory alloys that may be utilized, according to some example embodiments, may be temperature-sensitive, magnetic field-sensitive, electric field-sensitive, or light-sensitive. In this regard, thermoresponsive shape memory alloys (TSMAs) may be used that are responsive to changes in temperature, magneto-shape memory alloys (MSMAs) may be used that are responsive to changing magnetic fields, electro-shape memory alloys (ESMAs) may be used that are responsive to changing electric fields, or photo-shape memory alloys (PSMAs) may be used that are response to light or light intensity.

According to some example embodiments, a conductive shape memory polymer may be a conducting polymer such as polyaniline, polypyrrole, or polythiophene, which may be doped with conductive materials to enhance electrical conductivity. According to some example embodiments, a conductive carbon-based shape memory material may be a carbon nanotube or a graphene that exhibit shape memory properties when combined, for example, with suitable polymers or matrices. Additionally, according to some example embodiments, hybrids or composites of the conductive shape memory materials described herein may also be used, such as, shape memory alloy-polymer composites, carbon nanotube-polymer composites, and the like.

According to some example embodiments, the use of conductive shape memory material for a shape change antenna may require intricate and finely-controlled fabrication approaches. In this regard, according to some example embodiments, additive manufacturing techniques may be utilized that are able to use multi-dimensional printing technology for this purpose. For example, four-dimensional additive manufacturing techniques may be utilized that construct a shape change antenna to implement shape changes into different antenna geometries.

According to some example embodiments, to control the shape of the shape change antenna, a shape change stimulator may be implemented. The shape change stimulator may be controlled by circuitry, e.g., shape change control circuitry, to control the value of the non-geometric characteristic of the shape change antenna. The shape change stimulator may be configured to operate in accordance with the non-geometric characteristic for the conductive shape memory material used in the shape change antenna. Accordingly, in some example embodiments, the shape change stimulator may be controlled to vary the temperature of the antenna. Various controllable heating or cooling sources may be used, such as, for example, a resistive heater that changes the temperature of the shape change antenna based on an amount of electric current applied to the resistive heater. In some example embodiments, the shape change stimulator may be controlled to change a magnetic or electric field to which the antenna is exposed. In this regard, a controllable electromagnet or field coil may be used to generate and control a magnetic or electric field exposed to the shape change antenna. According to some example embodiments, the shape change stimulator may be manipulated to control light or light intensity applied to the shape change antenna. In this regard, a light source such as a light emitting diode or a laser source may be used to subject the shape change antenna to a desired light intensity or wavelength to effectuate a change in shape. In yet other example embodiments, the shape change stimulator may be controlled to apply a chemical (e.g., as a gas or liquid) to the shape change antenna to cause a shape change. In some example embodiments, such chemical application may cause a change in temperature of the shape change antenna or may temporarily react with the material of the shape change antenna to change its shape. As mentioned above, shape change control circuitry may be operably coupled to the shape change stimulator to control the operation of shape change stimulator, and thus the geometry of the antenna upon request.

Having provided a description of some example embodiments of an antenna assembly that may operate as a dynamically shapable antenna, figures will now be described to provide a more in depth discussion of some aspects and additional example embodiments. Reference is now made to FIG. 1A which illustrates a system-level scenario for an implementation of dynamically shapable antenna according to some example embodiments. In this regard, the system 1 may include a signaling device 10, an electromagnetic (EM) wave source 20, an EM wave destination 30, and an EM wave source/destination 40. The signaling device 10 may include control circuitry 11 and an EM signal interface 12. The EM signal interface 12 may include an antenna assembly 13. Antenna assembly 13 may, according to some example embodiments, include a shape change antenna and a shape change stimulator. The EM signal interface 12 may include a front end, such as a radio frequency (RF) front end, configured to condition a signal for transmission as a transmitted electromagnetic wave via a transmitter of the front end or condition a received electromagnetic wave received via a receiver of the front end for provision to the control circuitry 11. According to some example embodiments, the front end may receive instructions from the control circuitry 11 regarding an application to implement, and the EM signal interface 12 may, in turn, instruct the shape change stimulator to cause the shape change antenna to change to a desired geometry for the application. In this regard, for a first application, the shape change antenna of antenna assembly 13 may be caused to change to a first geometry that is optimized to receive an electromagnetic wave 21 from the EM wave source 20, which may be a transmitter or an unknown signal source that the signaling device 10 may be attempting to detect. For a second application, the shape change antenna of antenna assembly 13 may be caused to change to a second geometry that is optimized to transmit an electromagnetic wave 31 to the EM wave destination 30, which may be a communications receiver and the electromagnetic wave 31 may include information provided by the control circuitry 11 to the EM signal interface 12. For a third application, the shape change antenna of antenna assembly 13 may be caused to change to a third geometry that is optimized to transmit and receive electromagnetic wave, such as electromagnetic wave 41, to and from the EM wave source/destination 40, which may be a communications transceiver and the electromagnetic wave 41 may include information that is being exchanged between signaling device 10 and the EM wave source/destination 40. Accordingly, a single shape change antenna of the antenna assembly 13 may be configured to change shape into different geometries to support the implementation of three different applications that may require an antenna with different electromagnetic characteristics to perform the necessary signaling operations.

Now referring to FIG. 1B, a more specific block diagram of a signaling device 100, which may be the same or similar to the signaling device 10, is shown. The signaling device 100 may include control circuitry 110, a front end 120, and an antenna assembly 102.

The control circuitry 110 may include, for example, a processor or a controller and a memory module and may be configured as a hardware device or via the execution of software instructions to control operation of the signaling device 100. In some example embodiments, the control circuitry 110 may be implemented as an application specific integrated circuit (ASIC), a programmable gate array (PGA), or the like. The control circuitry 110 may be configured to implement, for example, high-level or user-level operations of the signaling device 100.

The front end 120 may be configured to condition a signal for transmission as a transmitted electromagnetic wave via a transmitter of the front end or condition a received electromagnetic wave received via a receiver of the front end 120 for provision to the control circuitry 110. In this regard, the front end 120 may be implemented via a plurality of components that may or may not be included in a system-on-a-chip form factor. In this regard, the front end 120 may include filters, RF amplifiers, local oscillators, mixers, intermediate frequency amplifiers and filters, and modulators/demodulators. According to some example embodiments, the front end 120 may be configurable to support the electromagnetic characteristics for a given application. In this regard, the front end 120 may include a local oscillator that is configured for operation at, for example, a desired frequency for a given application. According to some example embodiments, the front end 120 may include or be implemented as a software defined radio. In this regard, the front end 120 may include a processor or a controller and a memory module that may be configured to execute code instructions to configure the front end 120 to operate in accordance with desired parameters for a given application. According to some example embodiments, the front end 120 may be implemented in hardware, for example, as an ASIC, PGA, or the like. According to some example embodiments, the control circuitry 110 may provide instructions to the front end 120 with regard to the desired application to control the front end 120 in accordance with a desired application and associated electromagnetic signaling parameters for that application.

The antenna assembly 102, which may be one example of a dynamically shapable antenna, may include shape control circuitry 130, a shape change stimulator 140, and a shape change antenna 150. The shape control circuitry 130 may be specially configured to control the shape change stimulator 140 and thus the geometry of the shape change antenna 150. In this regard, the shape control circuitry 130 may receive instructions from the control circuitry 110 or the front end 120 regarding a desired application or desired electromagnetic characteristics to implement desired electromagnetic wave-related functionality. According to some example embodiments, the shape control circuitry 130 may be included or embodied in the control circuitry 110 or the front end 120. As further described below, the shape control circuitry 130 may be configured to control a heating or cooling element of the shape change stimulator 140, a magnetic field generator of the shape change stimulator 140, an electric field generator of the shape change stimulator 140, a light source of the shape change stimulator 140, a chemical dispenser of the shape change stimulator 140, or the like to control the geometry of the shape change antenna 150.

As such, the shape change stimulator 140 may be an apparatus that is controllable to change a non-geometric characteristic of the shape change antenna 150. As described herein, the non-geometric characteristic may be a temperature, a magnetic field strength, an electric field strength, a light intensity, a chemical exposure, or the like. According to some example embodiments, to control a temperature of the shape change antenna 150, the shape change stimulator 140 may include a heating or cooling element such as, for example, a resistive heater that may be imbedded in the shape change antenna 150 or affixed to an exterior of the shape change antenna 150. The heating or cooling element may be controlled by applying an electric voltage to the heating or cooling element where the voltage is a function of the heating or cooling performed by the element to control the temperature. According to some example embodiments, the heating or cooling element may be separated from the shape change antenna 150, but a fan or other airflow device may be implemented to force air of a desired temperature over the shape change antenna 150 to cause a change in the temperature of the antenna. According to some example embodiments, a magnetic field generator or an electric field generator may be a component of the shape change antenna 150 that is controllable to generate a desired magnetic field or electric field, respectively, to cause a shape change in the antenna 150. Alternatively, the shape change stimulator 140 may include a light source (e.g., light emitting diode, laser, or the like) that is controllable to apply light to the shape change antenna 150 to cause a change in shape. Alternatively, a chemical dispenser (e.g., sprayer) may be a component of the shape change stimulator 140 that is controllable to dispense a chemical onto the shape change antenna 150 to cause a change in shape.

According to some example embodiments, the shape change antenna 150 may be physically coupled to a base structure 160 that is fixed in position and supports the shape change antenna 150. In this regard, when the shape change antenna 150 changes shape, at least a portion of the shape change antenna 150 moves relative to the base structure. As such, as a static component, the base structure 160 provides a reference, relative to which, at least a portion of the shape change antenna 150 moves when the shape change antenna 150 transitions between geometries.

The signaling device 100 therefore includes an apparatus for transmitting or receiving electromagnetic waves. Moreover, the shape control circuitry 130 may be configured to, possibly under the control of the control circuitry 110 or the front end 120, control the shape change stimulator 140 to change a non-geometric characteristic to cause the antenna shape of the shape change antenna 150 to change. In this regard, the shape control circuitry 130 may be configured to control the shape change stimulator 140 to adjust the non-geometric characteristic to cause the shape change antenna 150 to change shape into a first geometry 151 having first electromagnetic characteristics for a first application. In the first application, for example, the shape change antenna 150 may be configured to operate as a wide-band sensor or detector. The control circuitry 110 may also instruct the front end 120 to transition into operation to support the first application. The control circuitry 110 may subsequently cause the shape change antenna 150 to transmit or receive an electromagnetic wave while in the first geometry 151 in accordance with the first application.

The control circuitry 110 may then be required to operate in accordance with a second application. As such, in response to instructions from the control circuitry 110 or the front end 120, the shape control circuitry 130 may be configured to control the shape change stimulator 140 to adjust the non-geometric characteristic to cause the shape change antenna 150 to change shape into a second geometry 152 having second electromagnetic characteristics for the second application. In this second application, for example, the shape change antenna 150 may be configured to operate as a narrow-band transmitting apparatus that focuses the a beam of the antenna. As the non-geometric characteristic changes, the shape of the shape change antenna 150 may also change. The control circuitry 110 may also instruct the front end 120 to transition to support the second application. The control circuitry 110 may subsequently cause the shape change antenna 150 to transmit or receive an electromagnetic wave while in the second geometry 152 in accordance with the second application. Subsequent transitions between the first and second geometries may be performed to support operations for the first and second applications.

According to some example embodiments, the antenna gain for the shape change antenna 150 may be different at different frequencies in the different geometries. For example, according to some example embodiments, when the shape change antenna 150 is in the first geometry 151, the antenna gain for the shape change antenna 150 may be above a gain threshold across a first frequency band, but not above the gain threshold across a second frequency band. Additionally, when the shape change antenna 150 is in the second geometry 152, the antenna gain may be above the gain threshold across the second frequency band, but not above the gain threshold across the first frequency band. According to some example embodiments, the first frequency band may be separated from the second frequency band by a significant amount, such as, for example, at least one megahertz.

According to some example embodiments, the gain threshold may be considered with respect to a specific operating frequency rather than a frequency band. In this regard, for example, according to some example embodiments, when the shape change antenna 150 is in the first geometry 151, the antenna gain for the shape change antenna 150 may be above a gain threshold at a first frequency, but not above the gain threshold at a second frequency. Additionally, when the shape change antenna 150 is in the second geometry 152, the antenna gain may be above the gain threshold at the second frequency, but not above the gain threshold at the first frequency. According to some example embodiments, the first frequency may be separated from the second frequency by a significant amount, such as, for example, at least one megahertz.

According to some example embodiments, when the antenna shape of the shape change antenna 150 is in the first geometry 151 the antenna may have a first radiation pattern, and when the antenna shape is the second geometry, the antenna may have a second radiation pattern. According to some example embodiments, the first radiation pattern and the second radiation pattern may have different electromagnetic field strengths (e.g., at least one millivolt per meter difference) at a common location relative to the shape change antenna 150 for a same input power.

Now referring to FIGS. 2A and 2B, an illustration of an example shape change antenna 250 in a first geometry 251 and in a second geometry 252, respectively, is shown. The shape change antenna 250 may be structured in a same or similar manner as the shape change antenna 150 and may operate in a same or similar manner as shape change antenna 150. A signaling device 200 is illustrated, which may be the same or similar to the signaling device 100. The signaling device 200 may include a housing 270 and a base structure 206. The shape change antenna 250 may be affixed to the base structure 260 at coupling 262.

The shape change antenna 250 may be a spiral-type antenna. According to some example embodiments, the shape change antenna 250 may include two conductors that spiral in an interleaved-manner from the central position of the coupling 262. As can be seen in FIG. 2A, in the first geometry 251 has a planar shape such that the spiraling conductors remain in the same plane throughout the spiral configuration. With reference to FIG. 2B, a shape change has occurred such that the shape change antenna 250 is now in a conical shape. For example, a shape change stimulator (e.g., shape change stimulator 140) may have been controlled by shape control circuitry (e.g., shape control circuitry 130) to transition from outputting a first temperature to cause the antenna shape to be the first geometry 251 to outputting a second, different temperature to cause the antenna shape to transition to the second geometry 252. Accordingly, in the example embodiment of FIG. 2B, in the second geometry, the spiral configuration is still present, however, due to conductive shape memory material, the change in the non-geometric characteristic of the shape change antenna 250 has caused the conductors of the shape change antenna 250 to move and extend away from base structure 260 into the conical shape of the second geometry 252 and out of the planar shape of the first geometry 251.

According to some example embodiments, to monitor the transition of the shape change antenna 250 from the first geometry 251 to the second geometry 252, the shape control circuitry 130 may be configured to measure a feedback parameter of the shape change antenna 250 to determine if the shape change antenna 250 has completed its transition from the first geometry 251 to the second geometry 252 (or from the second geometry 252 to the first geometry 251). The measurement of the parameter may provide a feedback loop to assist in controlling the shape change stimulator 140 to cause proper transitions between geometries. According to some example embodiments, the feedback parameter may be a video of the shape change antenna 250 that is automatically analyzed (e.g., by the control circuitry 110) to determine if a full transition to a desired geometry has occurred. According to some example embodiments, a resistance of the shape change antenna 250 may be measured as a feedback parameter, and, when a target resistance is reached, the transition to a desired geometry may be complete. In this regard, the changes in the conductive shape memory material may cause a proportional change in the electrical resistance of the material. Leveraging this relationship, a measurement of a voltage drop across a length of the shape change antenna may be divided by a measurement of the current flowing in the antenna, which may be used as a feedback parameter. According to some example embodiments, a 10-bit analog to digital converter (ADC) may be utilized to determine such a feedback parameter, where ADC inputs are outputs of an instrumentation amplifier configured to sense a difference between the voltages at the ends of the shape change antenna 250 and a Hall-effect current sensor in series with the shape change antenna 250. Accordingly, a value of the determined feedback parameter may be monitored to determine a current geometry of the shape change antenna 250.

As an alternative, a temperature of the shape change antenna 250 may be measured directly via a temperature probe and the temperature reading provided by the probe may be used as the feedback parameter. According to some example embodiments, placement of such a temperature probe on the shape change antenna 250 may be determined to minimize the effect on the electromagnetic characteristics of the shape change antenna 250. Alternatively, according to some example embodiments, a test transmission may be output at a selected frequency for either local or remote detection (and an associated remote response) to determine if the shape change antenna 250 is in a desired geometry.

According to some example embodiments, the housing 270 may include a multi-purpose dielectric stack-up for cable routing, convective cooling, and RF mitigation. In this regard, according to some example embodiments, the housing 270 may include a series of absorbers configured to mitigate the shape change antenna 250's radiated back-lobe. In some example embodiments, the housing 270 may include airflow channels that may convectively cool the shape change antenna 250 to support efficient transitions between geometries. According to some example embodiments, additional isolation features may be implemented. According to some example embodiments, a coaxial geometry transmission line may be included that creates an RF impedance mismatch boundary to isolate, for example, a DC voltage line, used for powering and controlling supporting components, from a signal line (e.g., RF line) at the base of the shape change antenna 250. By leveraging a direct proximity of a DC return line along shape change antenna 250, the entire DC current path can be cancelled or appear to be transparent to the signal line due to high impedance between the two DC lines.

Referring now to FIGS. 3A and 3B, a perspective top view of a shape change antenna 300 in a first geometry 313 and a side view of the shape change antenna 300 in a second geometry 314, respectively, are shown. The shape change antenna 300 is also a spiral-shaped shape change antenna and may therefore be the same or similar to the shape change antenna 250. FIG. 3A illustrates the shape change antenna 300 in a planar first geometry 313 (as indicated by the x, y, and z coordinate axes) and FIG. 3B illustrates the shape change antenna 300 in a conical second geometry 314 (as indicated by the y and z coordinate axes).

As mentioned above, the shape change antenna 300 may be formed of a conductive shape memory material, such as, for example, a shape memory alloy material, a conductive shape memory polymer, or a conductive shape memory carbon-based material, a hybrid combination thereof, or the like. According to some example embodiments, the material used to fabricate the shape change antenna 300 may affect the electromagnetic characteristics of the shape change antenna 300, regardless of geometry. According to some example embodiments, other physical characteristics may also affect the electromagnetic characteristics of the shape change antenna 300. For example, a gauge or cross-sectional area of the conductors (e.g., conductors 310 and 312 of shape change antenna 300) may affect the electromagnetic characteristics of the front end 120, regardless of geometry. According to some example embodiments, the conductors of the shape change antenna 300 may not have a uniform cross-sectional area across a length of the conductors, which may also affect the electromagnetic characteristics of the shape change antenna 300.

With respect to the specific geometries of the shape change antenna 300, a pitch or spacing between the spiraled conductors 310 and 312 may affect the electromagnetic characteristics in each of the geometries. Additionally, the number of the spiral turns of the conductors 310 and 312 may affect the electromagnetic characteristics of the shape change antenna 300 in each of the geometries. The linear length of the conductors 310 and 312 may also affect the electromagnetic characteristics of the shape change antenna 300 in each of the geometries. Such parameters may have a relationship to a radius 302 of the shape change antenna 300 in the first geometry 313, which may have a relationship to the electromagnetic characteristics of the shape change antenna 300 in the first geometry 313. According to some example embodiments, the radius 302 may be 0.15 meters. In the second geometry 314, a height 304 of the conical shape of the shape change antenna 300 may have an effect on the electromagnetic characteristics of the shape change antenna 300 in the second geometry 314. Additionally, an angle 306 of the conical shape of the second geometry 314 may also have an effect on the electromagnetic characteristics of the shape change antenna 300 in the second geometry 314. According to some example embodiments, while the conical shape of the second geometry 314 of the shape change antenna 300 is shown as being uniform in this example embodiment such that the angle 306 is the same for the height 304 of the second geometry 314, it is understood that other geometries may be implemented such as ones that are not uniform is shape and are therefore non-uniform.

As mentioned above, the different geometries of a shape change antenna, such as the shape change antenna 300, may result in different radiation patterns or beams. Accordingly, FIGS. 3C and 3D illustrate radiation patterns of the first geometry 313 of the shape change antenna 300 and the second geometry 314 of the shape change antenna 300, respectively. The radiation patterns shown in FIGS. 3C and 3D are plotted as the radiation pattern taken for operation of the geometries at 2 gigahertz (GHz). As can be seen in FIG. 3C, the planar shape of the shape change antenna 300 in the first geometry 313 generates a radiation pattern 350 that has a substantially spherical shape. However, the conical shape of the shape change antenna 300 in the second geometry 314 generates a radiation pattern 351 that is more directional extending along a center axis of the cone shape towards the larger diameter end. Accordingly, the radiation pattern 351 is a substantially ellipsoid shape. As such, the first radiation pattern and the second radiation pattern have different electromagnetic field strengths at a common location relative to the shape change antenna 300 (e.g., the coupling 262 or a feed point of the shape change antenna 300) for a same input power at a same frequency.

Now referring to FIG. 4A, a graph 400 of the performance of the first geometry 313 and the second geometry 314 of the shape change antenna 300 is shown with respect to frequency and gain. The plot 405 indicates the gain of the shape change antenna 300 in the first geometry 313 (e.g., planar or flat configuration) operating from 2 Ghz to 12 GHz. The plot 410 indicates the gain of the shape change antenna 300 in the second geometry 314 (e.g., conical configuration) operating from 2 Ghz to 12 GHz.

As can be seen, the first geometry 313 performs well with a gain of about 5 decibels (dB) at lower frequencies, from about 3 GHz to 7 GHz. However, the gain, and thus the performance of the first geometry 313 drop rapidly at the higher frequencies with a substantial drop from 7 Ghz to 12 Ghz. On the other hand, the second geometry 314 does not perform as well at lower frequencies with the gain dropping below 0 dB at 3 GHz. However, the second geometry 314 performs well at the higher frequencies averaging between 4.5 dB and 5 dB between 7 GHz and 12 Ghz.

Accordingly, the shape change antenna 300 may operate in an optimized manner by using the first geometry 313 when operating at lower frequencies and the second geometry 314 when operating at higher frequencies. As shown in the graph 400, a 2× improvement in gain can be realized by using the first geometry 313 at a frequency of 3 GHZ. Additionally, by using the second geometry 314 instead of the first geometry 313 at the higher frequencies, a 2× improvement in gain can be realized at 9 GHz, a 4× improvement in gain can be realized at 10 GHz, and an 8× improvement in gain can be realized at 11 GHz.

Now referring to FIG. 4B, a modified version of the graph 400 is shown as graph 450. In graph 450, application operating frequency bands have been defined with a first frequency band 466 from 3 GHz to 5 Ghz for a first application and a second frequency band 467 from 9 GHz to 11 Ghz for a second application. Non-operating bands 468, 469, and 470 have also been defined below 3 GHZ, from 5 GHz to 9 GHz, and above 11 GHz. Further, a gain threshold 465 may be defined, for example, at about 4.5 dB. As can be seen, in the first frequency band 466, the first geometry 313 operates above the gain threshold 465 across the entire first frequency band 466. However, the second geometry 314 does not operate above the gain threshold 465 across the entire first frequency band 466 due to dropping below the gain threshold 465 from about 3 GHz to about 3.75 GHz. As such, the first geometry 313 may be used in this first frequency band 466 for superior performance. Additionally, in the second frequency band 467, the second geometry 314 operates above the gain threshold 465 across the entire second frequency band 467. However, the first geometry 313 does not operate above the gain threshold 465 across the entire second frequency band 467 due to being below the gain threshold 465 for the entirety of the second frequency band 467. As such, the second geometry 314 may be used in this second frequency band 467 for superior performance. A resultant antenna performance graph 480 is shown in FIG. 4C for the shape change antenna 300. The shape change antenna 300 is shown as operating above the gain threshold 465 in both frequency bands 466 and 467. The gain plot 485 is for the shape change antenna 300 in the first geometry 313 and the gain plot 490 is for shape change antenna 300 in the second geometry 314.

Now referring to FIGS. 5A, 5B, and 6, example embodiments of some shape change stimulators will now be described in further detail. In this regard, with respect to FIG. 5A, an example shape change stimulator implementation is shown in association with an antenna assembly 500 and example shape change antenna 510. Shape change antenna 510 may be an example spiral-shaped shape change antenna. In this regard, according to some example embodiments, the antenna assembly 500 may include a shape change antenna 510, according to various example embodiments provided herein, with a shape change stimulator component in the form of a conductor 515 embedded within the shape change antenna 510. According to some example embodiments, the shape change antenna 510 may be fabricated with a lengthwise channel that the conductor 515 may be disposed within. Accordingly, an electric current may be passed through the conductor 515 (which may loop back to the source, not shown), and due to a relatively high resistance of the conductor 515, the conductor 515 may increase in temperature. As a result of the heat generated by the conductor 515, as a component of an example shape change stimulator, the shape change antenna 510 may change temperature. According to some example embodiments, as result of the change in temperature in the shape change antenna 510, the shape of the shape change antenna 510 may change, for example, from a first geometry to a second geometry. According to some example embodiments, to cool the shape change antenna 510 and revert the shape change antenna 510 back to, for example, a first geometry, the electric current passing through the conductor 515 may be ceased, which may permit the shape change antenna 510 to change to ambient temperature and thus back to the first geometry at specific temperature.

According to some example embodiments, the conductor 515 may alternatively be configured to generate a magnetic or electric field in response to a current passing through the conductor 515. In this regard, the conductor 515 may embedded in a helical fashion such that the passage of an electric current through the conductor 515 generates magnetic flux and/or an electric field. The generation of such magnetic or electric field via the conductor 515 may cause the shape change antenna 510 to change geometries between a first geometry and a second geometry. According to some example embodiments, rather than being coiled as an embedded conductor 515, the conductor 515 may be helically wrapped around an exterior surface of the shape change antenna 510 to generate heating, a magnetic field, or an electric field.

Now referring to FIG. 5B, another example shape change stimulator implementation is shown in association with an antenna assembly 550, again with the example shape change antenna 510. In this regard, according to some example embodiments, the antenna assembly 550 may include the shape change antenna 510, according to various example embodiments provided herein, with a shape change stimulator component in the form of an external element 530 applied to the shape change antenna 510. According to some example embodiments, the external element 530 may be, for example, a fluid filled tube. In this regard, the fluid within the tube may have a high heat transfer characteristic and therefore the fluid and the tube may heat receiving opening 516 cool the shape change antenna 510. Alternatively, according to some example embodiments, the external element 530 may be a flexible light pipe that permits light to propagate through to illuminate the shape change antenna 510, for example, in embodiments where the shape change antenna 510 is light sensitive to change from a first geometry to a second geometry.

Now referring to FIG. 6, various example implementations of a shape change stimulator are provided with respect to the shape change stimulator 600 in association with the shape change antenna 300. In this regard, an example embodiment of shape control circuitry 130 may be operably coupled to various components of the shape change stimulator 600 to control the operation of such components to cause the shape change antenna 300 to change geometries. According to some example embodiments, the shape change antenna 300 may be disposed within a container 671 having highly permeable walls. The shape change antenna 300 may be protected within the containment space 670. Additionally, the containment space 670 may be insulated with permeable materials to, for example, more readily maintain temperatures, contain dispersed chemicals, or trap and reflect light.

According to some example embodiments, the shape control circuitry 130 may control the light sources 680 (e.g., light emitting diodes, lasers, etc.) to illuminate the shape change antenna 300 and cause associated changes in geometry. Additionally, according to some example embodiments, the shape change stimulator 600 may include a conductor 660 between the shape control circuitry 130 and the shape change antenna 300 that may be used to pass an electric current directly through the shape change antenna 300 to cause self-heating and associated changes in geometries. Alternatively, the shape control circuitry 130 may be operably coupled to an electromagnet 650 via connection 655. According to some example embodiments, the electromagnet 650 may include a ferrous metal with a conductor wrapped around the ferrous metal. According to some example embodiments, the ferrous metal may have a toroidal or annular shape. The shape control circuitry 130 may be configured to pass electric currents through the wrapped conductor to generate a changing magnetic or electric field to thereby trigger the shape change antenna 300 to change geometries.

According to some example embodiments, the shape control circuitry 130 may control operation of shape change stimulator component 620 which may include a heating or cooling element and a fan. As such, heated or cooled air 640 may be forced from the heating receiving opening 516 cooling element by an airflow from the fan through the pipes 630 and out the openings 642 to thereby heat or cool the shape change antenna 300 and cause a change in geometry. Alternatively, the shape change stimulator component 620 may include a chemical reservoir and a dispenser that forces, for example an aerosol or liquid chemical through the pipes 630 and out the openings 642 to interact with the shape change antenna 300 to cause an associated change in geometry. It is noted that while the shape change stimulator 600 is shown with a plurality of different approaches for changing a non-geometric characteristic of the shape change antenna 300, it is understood that some example embodiments may employ only of these approaches.

Now referencing FIGS. 7A, 7B, 8A, 8B, 9A, and 9B, some additional examples of antenna geometries are shown for various shape change antennas. Such additional examples are provided to explain that an implementation of a shape change antenna may take a variety of architectures and is not limited to any one architecture described herein. In this regard, an example shape change antenna 700 is shown in FIGS. 7A and 7B. In FIG. 7A, the shape change antenna 700 has an antenna shape in a first geometry 705 that is a folded dipole shape. In response to a change in a non-geometric characteristic, the shape change antenna 700 may be configured to change from folded dipole shape of the first geometry 705 to a second geometry 710, as shown in FIG. 7B. In the second geometry 710, the antenna shape of the shape change antenna 700 is a loop antenna shape.

Now referring to FIGS. 8A and 8B, another example shape change antenna 800 is shown. The shape change antenna 800 may be generally shaped as a horn antenna. In FIG. 8A, the shape change antenna 800 has an antenna shape in a first geometry 805 that includes a substantially uniform conically-shaped horn antenna. In response to a change in a non-geometric characteristic, the shape change antenna 800 may be configured to change from the first geometry 805 to a second geometry 810, as shown in FIG. 8B. In the second geometry 810, the antenna shape of the shape change antenna 800 has a narrower horn opening and a length of the horn antenna has been reduced relative to the first geometry 805 resulting in different electromagnetic characteristics for the second geometry 810.

Now referring to FIGS. 9A and 9B, another example shape change antenna 900 is shown. The shape change antenna 900 may be generally shaped as a dish or parabolic antenna shown in cross-section. In FIG. 9A, the shape change antenna 900 has an antenna shape in a first geometry 905 that is parabolic with a first degree of concavity and associated electromagnetic characteristics such that a focal point of the first geometry 905 is located at receiver 920. Accordingly, electromagnetic waves, such as electromagnetic wave 940 may interact with the shape change antenna 900 in the first geometry 905 and are reflected to the receiver 920. In response to a change in a non-geometric characteristic, the shape change antenna 900 may be configured to change from the first geometry 905 to a second geometry 910, as shown in FIG. 9B. In the second geometry 910, the antenna shape of the shape change antenna 900 is parabolic with a second degree of concavity and associated electromagnetic characteristics such that a focal point of the second geometry 910 is located at receiver 925. Accordingly, electromagnetic waves such as electromagnetic wave 942 interact with the shape change antenna 900 in the second geometry 910 and are reflected to the receiver 925, which is located at a different position than the receiver 920.

Now with reference to FIG. 10, another signaling device 1000 is shown that is similar to the signaling device 100, according to some example embodiments. In this regard, the signaling device 1000 includes the control circuitry 110, the shape control circuitry 130, the shape change stimulator 140, the shape change antenna 150, and the base structure 160. However, the signaling device 1000 includes a front end 1010 that, in turn, includes a software defined radio 1015. The implementation of a software defined radio 1015 together with the shape change antenna 150 provides a platform for a variety of dynamic, multi-dimensional operational configurations for the signaling device 1000. The software defined radio 1015 contributes additional degrees of versatility and flexibility to the signaling device 1000, particularly when combined with the shape change antenna 150 and its dynamic geometries. Since a software defined radio 1015, according to some example embodiments, may be dynamically reconfigured to operate on different frequency bands, modulation schemes, and communications protocols, the implementation of a software defined radio 1015 can be optimally aligned with the various geometries of the shape change antenna 150 to support an even broader range of applications.

Now referring to FIG. 11, another implementation of a signaling device 1100 is provided. The signaling device 1100 includes the control circuitry 110, the front end 120, and the shape control circuitry 130. However, rather than support a single shape change antenna 150, the control circuitry 110, the front end 120, and the shape control circuitry 130 may be, according to some example embodiments, configured to support the operation of a plurality of shape change antennas combined into a shape change antenna array 1110. Operating in an array, a plurality of shape change antennas may be configured to support a broader range of electromagnetic characteristics for a wider variety of applications. In this regard, the shape control circuitry 130 may be configured to control each shape change antenna within the shape change antenna array 1110 independently (e.g., via x control lines) to leverage additional degrees of freedom offered by an array implementation. Moreover, the front end 120, whether implemented with a software defined radio or not, may provide tailored signals to each shape change antenna within the shape change antenna array 1110 (e.g., via y signal lines) to control the electromagnetic characteristics of the overall signaling device 1100.

In this regard, an example shape change antenna array 1200 is shown in FIG. 12A, according to some example embodiments. The shape change antenna array 1200 includes a plurality of shape change antennas 1210 affixed to an array base 1260 in grid or matrix configuration. In the example implementation shown in FIG. 12A, the shape change antenna array 1200 includes an 8×5 array of 40 shape change antennas 1210. As described above, each shape change antenna 1210 may be independently controlled with respect to its geometry. Further, the front end may provide uniquely tailored signals (e.g., using a phased array technique) to each of shape change antennas 1210, not only based on their relative position within the array, but also based on a controllable geometry of each of the shape change antennas 1210.

According to some example embodiments, the shape change antennas 1210 may be configured to operate in unison based on a particular application being implemented. As such, according to some example embodiments, the geometries of the plurality of shape change antennas 1210 may be controlled together as shown in FIG. 12B. In this regard, as shown in FIG. 12B, all shape change antennas 1210 of the shape change antenna array 1200 have been controlled to transition from a first geometry as shown in FIG. 12A to a second geometry as shown in FIG. 12B. Although collective control of the shape change antennas 1210 may be limiting to some degree, the ability to even change the geometry of all shape change antennas 1210 still offers an additional degree of freedom from the perspective of solution development.

As shown in FIG. 12C, an implementation where each shape change antenna 1210 is independently controlled with respect to geometry is shown. As can be seen in FIG. 12C, shape change antennas 1210*a* have antenna shapes of a first geometry, while shape change antennas 1210*b* have antenna shapes of a second geometry. In this manner, with individually controllable shape change antennas within the shape change antenna array 1200, an even further and increasingly flexible and versatile solution can be realized through the individual addressability of the shape change antennas of the shape change antenna array 1200 with respect to both signaling and geometry.

Now referring to FIGS. 13A, 13B, and 13C, some example implementation contexts for a dynamically shapable antenna are shown. In this regard, for example, such a dynamically shapable antenna 1312 may be implemented in a backpack signaling device 1310. In this regard, the versatility of the dynamically shapable antenna 1312 for differing applications may be particularly useful in a backpack implementation where the small size and weight support mobility, while also supporting application flexibility as described herein as a result of the controllable geometries of the shape change antenna of the dynamically shapable antenna 1312. Similarly, with respect to FIG. 13B, the drone 1320 may also benefit from implementation of a dynamically shapable antenna 1322. In this regard, drones, such as the drone 1320, may be used to infiltrate deep into a controlled environment where electromagnetic wave sensing technology would be beneficial. However, the drone 1320 may also be required to communicate with a remote controller to receive operational instructions and report back information. Again, the size and weight benefits of the dynamically shapable antenna 1322 also greatly benefit a drone implementation. Finally, according to some example embodiments, a dynamically shapable antenna 1332 may also be implemented in the context of a spacecraft 1330 as shown in FIG. 13C. Similar to the implementation in the drone context, the spacecraft 1330, which may be a satellite, may be implemented to perform signal detection with a shape change antenna of the dynamically shapable antenna 1332 in a first geometry and communications with the shape change antenna in a second geometry. Additionally, the spacecraft 1330 also clearly benefits from the size and weight improvements realized by the implementation of a dynamically shapable antenna 1332.

Now referring to FIG. 14, an example method for modifying electromagnetic characteristics by changing an antenna shape of a shape change antenna is provided in association with the flowchart 1400. In this regard, the example method may include, at 1410, controlling, by circuitry (e.g., the shape control circuitry 130), a shape change stimulator (e.g., shape change stimulator 140) to change a non-geometric characteristic of shape change antenna (e.g., shape change antenna 150) to a first value to cause the antenna shape to physically change into a first geometry. According to some example embodiments, the shape change antenna may be formed of a material including a shape memory material that responds to changes in the non-geometric characteristic. The example method may further include, at 1420, transmitting or receiving electromagnetic waves via the shape change antenna with the antenna shape being in the first geometry. At 1430, the example method may also include controlling, by the circuitry, the shape change stimulator to change the non-geometric characteristic of the shape change antenna to a second value, different from the first value, to cause the antenna shape to physically change from the first geometry to a second geometry. Additionally, at 1440, the example method may include transmitting or receiving a second electromagnetic wave via the shape change antenna while the antenna shape is in the second geometry.

Many modifications and other example embodiments, in addition to those set forth herein, will come to mind to one skilled in the art to which these embodiments pertain having the benefit of the teachings presented in the foregoing descriptions and the associated drawings. Therefore, it is to be understood that the embodiments are not to be limited to those disclosed and that modifications and other embodiments are intended to be included within the scope of the inventions set forth herein and in the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus for transmitting or receiving electromagnetic waves, the apparatus comprising:

a base structure;

a front end configured to condition a signal for transmission as a transmitted electromagnetic wave via a transmitter of the front end or condition a received electromagnetic wave received via a receiver of the front end;

a shape change antenna operably coupled to the front end and configured to transmit the transmitted electromagnetic wave or receive the received electromagnetic wave, the shape change antenna having an antenna shape and being formed of a material comprising a conductive shape memory material that physically moves in response to changes in a non-geometric characteristic, the shape change antenna being physically coupled to the base structure;

a shape change stimulator configured to change the non-geometric characteristic to cause the antenna shape of the shape change antenna to physically change; and shape control circuity configured to control the shape change stimulator to change the non-geometric characteristic to cause the antenna shape to change between a first geometry and a second geometry, wherein at least a portion of the shape change antenna physically moves relative to the base structure as the shape change antenna transitions between the first geometry and the second geometry.

2. The apparatus of claim 1, shape control circuity is configured to control the shape change stimulator to repeatedly change the non-geometric characteristic between a first value and a second value to cause the antenna shape to repeatedly change between the first geometry and the second geometry.

3. The apparatus of claim 1, wherein, when the antenna shape is in the first geometry, an antenna gain for the shape change antenna is above a gain threshold at a first frequency and below the gain threshold at a second frequency; and wherein, when the antenna shape is in the second geometry, the antenna gain is above the gain threshold at the second frequency and below the gain threshold at the first frequency;

wherein the first frequency is separated from the second frequency by at least one megahertz.

4. The apparatus of claim 3, wherein the shape control circuity is configured to control the shape change stimulator to change the non-geometric characteristic to cause the antenna shape to change to the first geometry and, while the antenna shape is in the first geometry, the shape change antenna is configured to receive the received electromagnetic wave at the first frequency for provision to the front end; and wherein the shape control circuitry is configured to control the shape change stimulator to change the non-geometric characteristic to cause the antenna shape to change from the first geometry to the second geometry and, while the antenna shape is in the second geometry, the shape change antenna is configured to transmit the transmitted electromagnetic wave at the second frequency provided from the front end.

5. The apparatus of claim 1, wherein, when the antenna shape is the first geometry, the shape change antenna has a first radiation pattern;

wherein, when the antenna shape is the second geometry, the shape change antenna has a second radiation pattern;

wherein the first radiation pattern and the second radiation pattern have different electromagnetic field strengths at a common location relative to the shape change antenna for a same input power.

6. The apparatus of claim 1, wherein the shape change antenna is configured to operate as a wide-band sensor when the antenna shape is the first geometry; and wherein the shape change antenna is configured to operate as a narrow-band transmitting apparatus when the antenna shape is in the second geometry.

7. The apparatus of claim 1, wherein the non-geometric characteristic is temperature, magnetic field strength, electric field strength, or light intensity.

8. The apparatus of claim 1, wherein the non-geometric characteristic is temperature;

wherein the shape control circuitry is configured to control the shape change stimulator to output a first temperature to cause the antenna shape to be the first geometry and output a second temperature to cause the antenna shape to be the second geometry;

wherein the first temperature is different from the second temperature.

9. The apparatus of claim 1, wherein the shape control circuitry is configured to measure a resistance of the shape change antenna as a feedback parameter to determine whether the antenna shape is the first geometry or the second geometry.

10. The apparatus of claim 1, wherein the conductive shape memory material comprises a shape memory alloy, a shape memory conductive polymer, or a shape memory conductive carbon-based material.

11. The apparatus of claim 1, wherein the first geometry comprises a planar spiral and the second geometry comprises a cone-shaped spiral.

12. The apparatus of claim 1, wherein the front end comprises a software defined radio.

13. The apparatus of claim 1 further comprising a plurality of shape change antennas configured to operate as a phased array of shape change antennas.

14. An antenna assembly comprising:

a shape change antenna configured to transmit an electromagnetic wave or receive an electromagnetic wave, the shape change antenna having an antenna shape and being formed of a material comprising a conductive shape memory material that physically moves in response to changes in a non-geometric characteristic; and a shape change stimulator configured to change the non-geometric characteristic of the shape change antenna to cause the antenna shape to physically change between a first geometry and a second geometry, wherein when the antenna shape is the first geometry, the shape change antenna has a first radiation pattern, when the antenna shape is the second geometry, the shape change antenna has a second radiation pattern, and the first radiation pattern and the second radiation pattern have different electromagnetic field strengths at a common location relative to the shape change antenna for a same input power.

15. The antenna assembly of claim 14, wherein the shape change antenna is configured to repeatedly change the antenna shape between the first geometry and the second geometry.

16. The antenna assembly of claim 14, wherein, when the antenna shape is the first geometry, an antenna gain for the shape change antenna is above a gain threshold across a first frequency band and not above the gain threshold across a second frequency band; and wherein, when the antenna shape is the second geometry, the antenna gain is above the gain threshold across the second frequency band and not above the gain threshold across the first frequency band;

wherein the first frequency band is separated for the second frequency band by at least one megahertz.

17. The antenna assembly of claim 14, wherein the non-geometric characteristic is temperature, magnetic field strength, electric field strength, or light intensity.

18. The antenna assembly of claim 14, wherein the non-geometric characteristic is temperature;

wherein the shape change stimulator is configured to output a first temperature to cause the antenna shape to be the first geometry and output a second temperature to cause the antenna shape to be the second geometry;

wherein the first temperature is different from the second temperature.

19. A method for modifying electromagnetic characteristics by changing an antenna shape of a shape change antenna, the method comprising:

controlling, by circuitry, a shape change stimulator to change a non-geometric characteristic of the shape change antenna to a first value to cause the antenna shape to physically change into a first geometry to cause the shape change antenna to have a first radiation pattern, the shape change antenna being formed of a material comprising a conductive shape memory material that responds to changes in the non-geometric characteristic;

transmitting or receiving an electromagnetic wave via the shape change antenna in the first geometry;

controlling, by the circuitry, the shape change stimulator to change the non-geometric characteristic of the shape change antenna to a second value, different from the first value, to cause the antenna shape to physically change from the first geometry to a second geometry to cause the shape change antenna to have a second radiation pattern; and transmitting or receiving a second electromagnetic wave via the shape change antenna in the second geometry, wherein the first radiation pattern and the second radiation pattern have different electromagnetic field strengths at a common location relative to the shape change antenna for a same input power.

* * * * *